(12) United States Patent
Schurtenberger

(10) Patent No.: US 11,879,424 B2
(45) Date of Patent: Jan. 23, 2024

(54) HYDROELECTRIC/HYDROKINETIC TURBINE AND METHODS FOR MAKING AND USING SAME

(71) Applicant: Walter Schurtenberger, Key West, FL (US)

(72) Inventor: Walter Schurtenberger, Key West, FL (US)

(73) Assignee: Hydrokinetic Energy Corp., Key West, FL (US)

( * ) Notice: Subject to any disclaimer, the term of this patent is extended or adjusted under 35 U.S.C. 154(b) by 0 days.

(21) Appl. No.: 17/528,022

(22) Filed: Nov. 16, 2021

(65) Prior Publication Data

US 2022/0074380 A1 Mar. 10, 2022

Related U.S. Application Data

(63) Continuation of application No. 16/403,472, filed on May 3, 2019, now Pat. No. 11,174,829, which is a
(Continued)

(51) Int. Cl.
*F03B 3/18* (2006.01)
*F03B 11/02* (2006.01)
(Continued)

(52) U.S. Cl.
CPC ............... *F03B 3/18* (2013.01); *F03B 3/04* (2013.01); *F03B 3/121* (2013.01); *F03B 3/126* (2013.01);
(Continued)

(58) Field of Classification Search
CPC .. F03B 3/04; F03B 3/121; F03B 3/126; F03B 3/18; F03B 11/02; F03B 17/061;
(Continued)

(56) References Cited

U.S. PATENT DOCUMENTS

| | | | | |
|---|---|---|---|---|
| 3,986,787 A | * | 10/1976 | Mouton, Jr. | ........ F03B 17/061 415/121.2 |
| 8,376,686 B2 | * | 2/2013 | Presz, Jr. | ................. F03B 3/04 415/908 |

(Continued)

OTHER PUBLICATIONS

Prosecution of counterpart Canadian patent application No. 2,976,226, including 1st Office Action dated May 4, 2022 (7 pgs), Response to 1st Office Action dated Sep. 6, 2022 (14 pgs), 2nd Office Action dated Feb. 1, 2023 (6 pgs), and Response to 2nd Office Action dated Jun. 1, 2023 (29 pgs); 56 pages total.

*Primary Examiner* — Brian O Peters

(57) ABSTRACT

The application relates to unidirectional hydrokinetic turbines having an improved flow acceleration system that uses asymmetrical hydrofoil shapes on some or all of the key components of the turbine. These components that may be hydrofoil shaped include, e.g., the rotor blades (34), the center hub (36), the rotor blade shroud (38), the accelerator shroud (20), annular diffuser(s) (40), the wildlife and debris excluder (10, 18) and the tail rudder (60). The fabrication method designs various components to cooperate in optimizing the extraction of energy, while other components reduce or eliminate turbulence that could negatively affect other component(s).

27 Claims, 24 Drawing Sheets

Related U.S. Application Data continuation of application No. 15/697,401, filed on Sep. 6, 2017, now Pat. No. 10,294,913, which is a continuation of application No. PCT/US2016/017857, filed on Feb. 12, 2016.

(60) Provisional application No. 62/115,540, filed on Feb. 12, 2015.

(51) Int. Cl.
  *F03B 17/06* (2006.01)
  *F03B 3/04* (2006.01)
  *F03B 3/12* (2006.01)

(52) U.S. Cl.
  CPC ............ *F03B 11/02* (2013.01); *F03B 17/061* (2013.01); *F05B 2220/7068* (2013.01); *F05B 2230/6102* (2013.01); *F05B 2230/80* (2013.01); *F05B 2240/124* (2013.01); *F05B 2240/13* (2013.01); *F05B 2240/33* (2013.01); *F05B 2240/911* (2013.01); *F05B 2240/93* (2013.01); *F05B 2240/97* (2013.01); *F05B 2250/232* (2013.01); *F05B 2250/73* (2013.01); *F05B 2260/84* (2013.01); *Y02E 10/20* (2013.01); *Y02E 10/30* (2013.01); *Y02P 70/50* (2015.11)

(58) Field of Classification Search
  CPC ...... F05B 2220/7068; F05B 2230/6102; F05B 2230/80; F05B 2240/124; F05B 2240/13; F05B 2240/33; F05B 2240/97; F05B 2250/232; F05B 2250/73; F05B 2260/84
  See application file for complete search history.

(56) References Cited

U.S. PATENT DOCUMENTS

| | | | |
|---|---|---|---|
| 8,674,538 B2* | 3/2014 | Lugg | ..................... F03D 1/0675 290/55 |
| 10,030,520 B2* | 7/2018 | Duchene | ................. F03B 3/126 |
| 2005/0285407 A1 | 12/2005 | Davis et al. | |
| 2010/0129193 A1* | 5/2010 | Sherrer | ................. F03D 3/0436 415/21 |
| 2013/0043685 A1 | 2/2013 | Sireli et al. | |

* cited by examiner

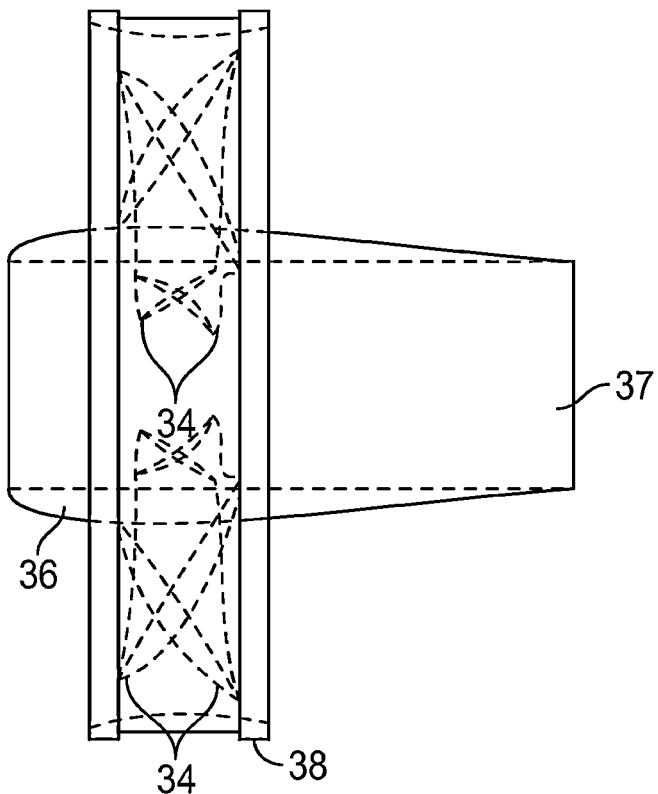
FIG. 11
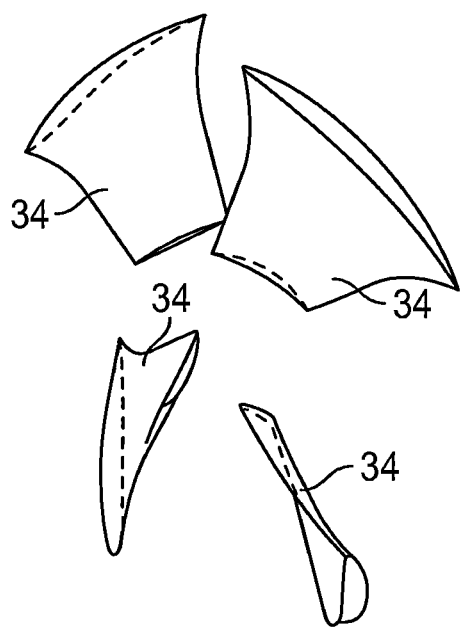 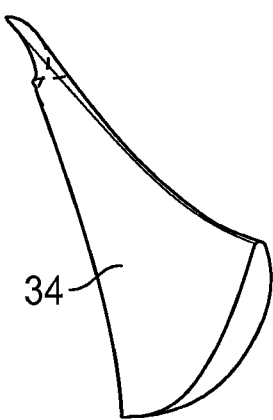
FIG. 12  FIG. 12A

6kn Profile

3kn Profile

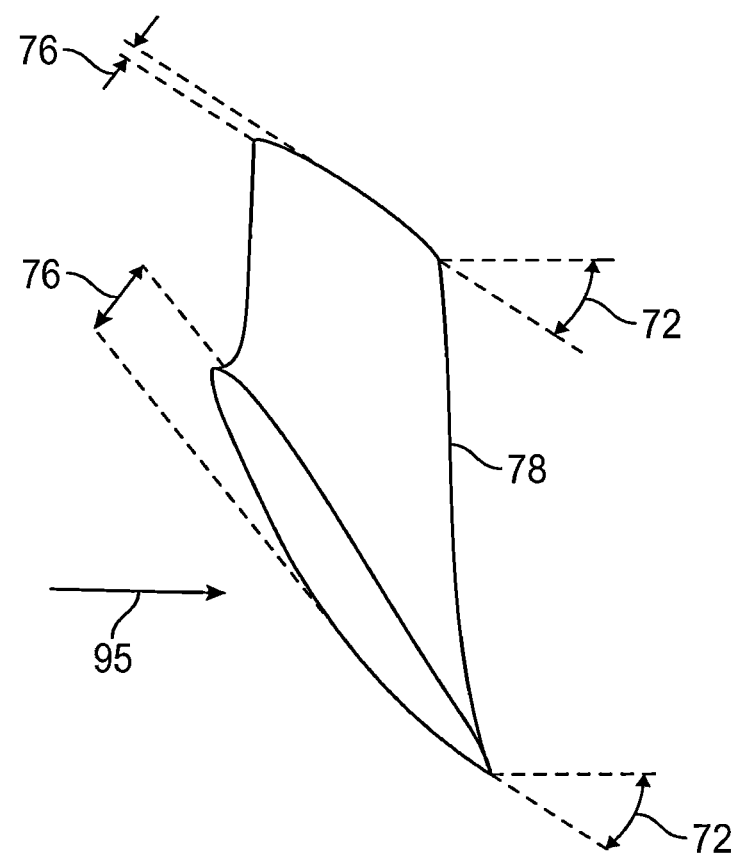
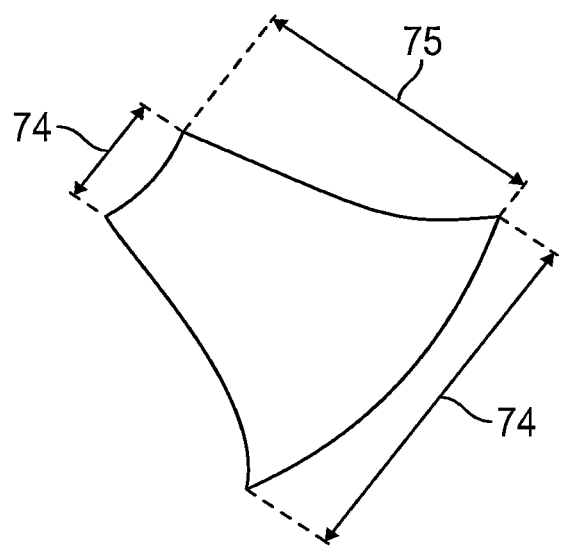
FIG. 34

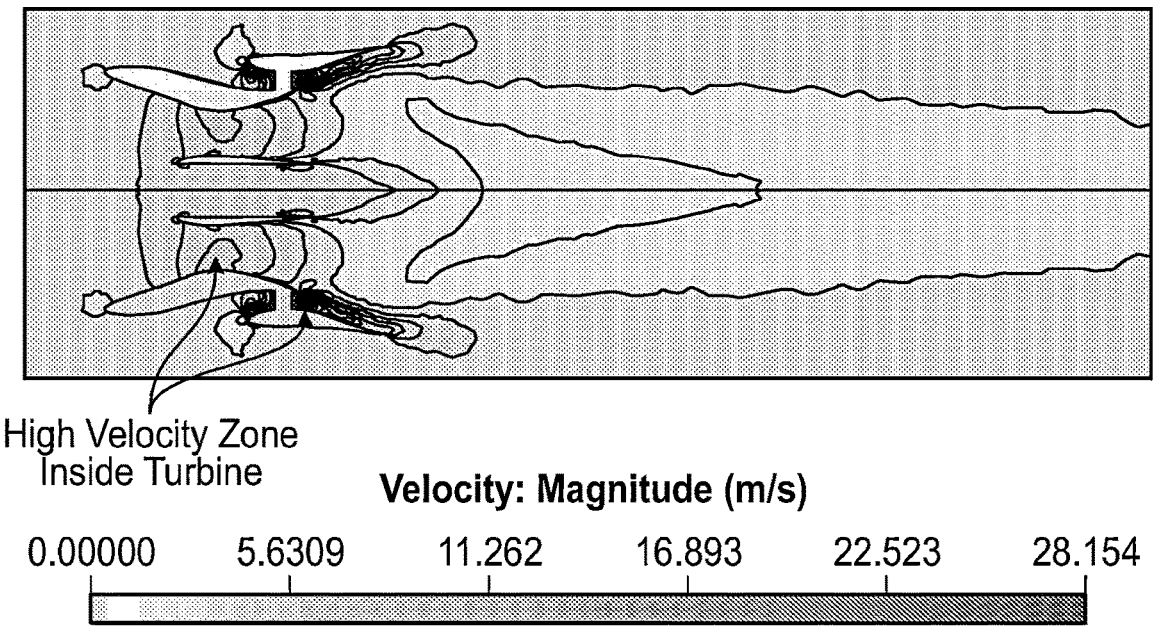
FIG. 37A
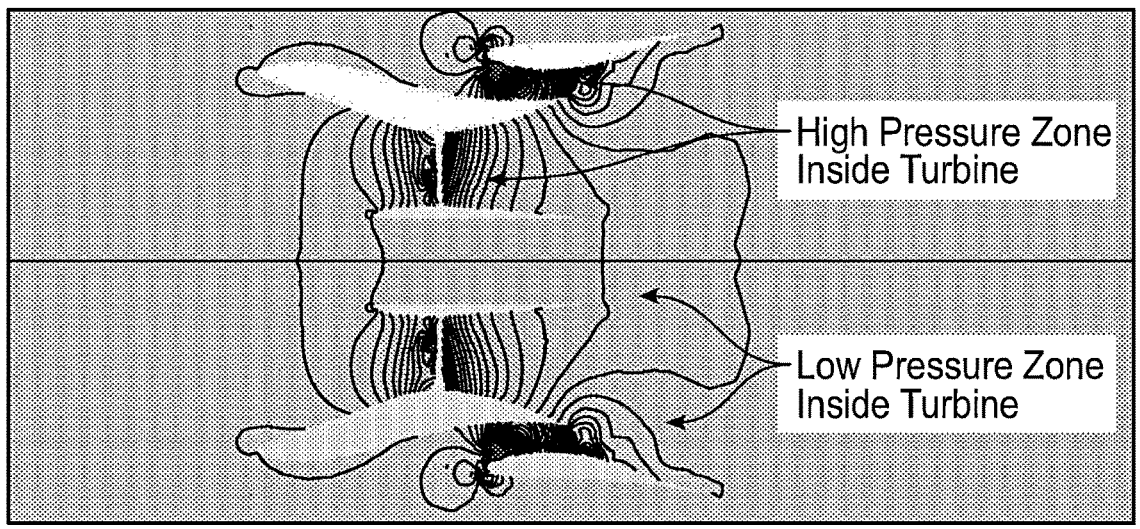
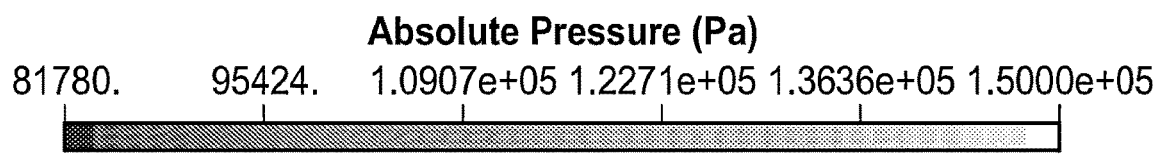
FIG. 37B

HYDROELECTRIC/HYDROKINETIC TURBINE AND METHODS FOR MAKING AND USING SAME

CROSS-REFERENCE TO RELATED APPLICATIONS

The present application is a continuation of co-pending U.S. application Ser. No. 16/403,472, filed May 3, 2019, now U.S. Pat. No. 11,174,829, which is a continuation of U.S. application Ser. No. 15/697,401, filed Sep. 6, 2017, now U.S. Pat. No. 10,294,913, which is a continuation of International Application No. PCT/US16?17857, filed Feb. 12, 2016, which claims benefit of U.S. Provisional Application No. 62/115,540, filed Feb. 12, 2015.

BACKGROUND OF THE INVENTION

The present invention relates to hydrokinetic turbines designed for the purpose of generating electricity, and to methods for designing and using such turbines. It further relates to certain elements employed in hydrokinetic turbines. The turbines according to the invention are intended to be placed underwater, in a fixed, floating, anchored or towed configuration, in any location where the effective water current preferably flows with a minimum speed of about 0.25 m/s. The water flow or current may be of any type or source, although typically it is comprised of one or more of the following types of water flow or current:
  a) Fixed, floating or anchored in continuous water flow or current, as found, e.g., in ocean currents, rivers or streams.
  b) Fixed, floating or anchored in fluctuating, alternating and/or cyclical water flow or currents that may change direction periodically or irregularly, as found, e.g., in tidal flow or seasonal flow.
  c) Fixed, floating or anchored in mechanically or naturally induced occurring currents that are created by, e.g., filling and emptying of reservoirs, lakes, dams or locks.
  d) The device may be towed through the water by a vessel or other device or method to artificially or effectively create a flow through the device.

The power of flowing water has been used by mankind for millennia to generate energy of various kinds for many different purposes. It has been used for milling grain, belt driven applications to run machines in factories and to power many kinds of devices mechanically. For the last 150 years water flow has proven to be very efficient for electrical generation in countless different designs and applications.

The basic principle of using permanent magnets and copper coils to generate electricity is still being used today in many different forms, including using flowing water and water turbines to drive electrical generators and alternators.

Most ocean currents are caused by wind, which in turn is caused by the Coriolis forces coming from the rotation of the earth. These currents are often influenced by the position of landmasses that can divert the flow and in some cases accelerate the flow. Ocean currents can also be caused by density differences in water masses, temperature differences or variations in the salinity of the water. The ocean currents on this planet are probably the biggest untapped source of energy in existence. River currents are also often used as a very good and efficient source of energy.

Since the beginning of technological development, there have been many different attempts made to harvest this energy with varying degrees of success and efficiency. The currents that are most accessible and easiest to use for energy generation are near-shore surface currents of the ocean and river currents. Water flow can also be produced artificially by building dams and creating reservoirs to accumulate large masses of water that can be utilized on demand.

In 1882 the world's first hydroelectric power plant was on the Fox River in Appleton Wisconsin. By 1889, 200 electrical plants were built in the USA, and by 1920, hydropower was used for 25% of US electrical generation, which usage by 1940 went up to 40%. Today only 6 to 8% of the electricity produced in the United States comes from hydropower. There are vast opportunities and significant environmental and cost advantages to be gained by replacing conventional coal-fired power plants with hydroelectric installations. Older installations of hydroelectric power plants are mostly situated inside dams or below dams using the pressure at the bottom of the dam to operate a water turbine that drives electric generators.

Since World War I the field of science, today called fluid dynamics, has developed tremendously and become a very precise and finite science which is used today in the design of modern hydrofoils. Hydrofoils (as well as airfoils, also part of fluid dynamics) are used for a large variety of purposes, including most designs in aeronautics, in motor vehicles, in watercraft, and in isolated elements employed in hydrokinetic turbines.

Hydrokinetic turbines can be divided up into different categories or types. For example, a turbine can either be bi-directional or unidirectional. In the former case, the turbine in defined such that it can be operated by a current that flows in both axial directions through the turbine, e.g., to be actuated to generate power both by an incoming tidal flow as well as by a receding tidal flow. On the other hand, a unidirectional turbine is driven only by the flow of water in a single axial direction. From a hydrodynamic standpoint, the design criteria to produce a bi-directional turbine are significantly more limited than in the case of a unidirectional turbine, i.e., all design criteria that would produce an adverse effect upon reversal of fluid flow direction.

Another way of categorizing hydrokinetic turbines resides in their hub design, namely, whether the center hub is either closed or open. Traditionally, most hydrokinetic turbines possess a non-rotating (fixed with respect to the turbine outer shroud) center hub that is closed or solid, and about which the rotor blades rotate. See, e.g., the following documents for examples: U.S. Pat. No. 3,986,787 to Mouton et al., U.S. Pat. No. 4,221,538 to Wells, U.S. Pat. No. 4,313,711 to Lee, U.S. Pat. No. 4,421,990 to Heuss et al., U.S. Pat. No. 6,168,373 to Vauthier, U.S. Pat. No. 6,406,251 to Vauthier and GB 2,408,294 to Susman et al. Some designs have a solid center hub, but rotate about bearings between a radially outer rotor ring and a turbine shroud, as disclosed, e.g., in U.S. Pat. No. 4,163,904 to Skendrovic.

More recently, one company has pursued hydrodynamic turbine designs in which there is provided an open center hub, for environmental reasons, i.e., to provide a safe passageway for sea creatures. See, e.g., the following documents for examples: U.S. Pat. Nos. 6,957,947, 7,378,750, 8,308,422 and 8,466,595. In these basically hubless designs, the rotor blades are typically mounted at the radial inside upon an inner ring member, and on the radial outside on an outer ring member, and in some designs, there is no inside ring member present at all. These basically hubless turbine designs are all bi-directional and are axially symmetrical in design.

In an adaptation of the open center concept, a type of hydrokinetic turbine is disclosed that is of the fixed center hub design noted above, but also includes a passageway or an opening in the center hub. See, e.g., US 2013/00443685 to Sireli et al., U.S. Pat. No. 7,471,009 to Davis et al., both of which relate to a unidirectional turbine design. Also see, U.S. Pat. No. 7,874,788 to Stothers et al., and US 2010/0007148 to Davis et al., which relate to specially-configured, bi-directional hydrokinetic turbines that include the optional use of an open center hub or, in the latter, a bypass opening in the hub, as in related Davis et al. '009, noted above (see FIG. 7 of both).

Hydrokinetic power generation remains of great interest and has gained growing importance along with solar power and wind power. There is a need for significant effort to be made to design and build much more sophisticated and highly efficient hydrokinetic power-generating turbines; however, because the process of refining turbine designs is in many respects unpredictable and therefore time-consuming, there has unfortunately been a tendency to simply build larger versions of existing turbine designs in order to gain larger energy output from them. New, highly efficient turbines will enable the extraction of increased amounts of energy from a renewable source, with practically no environmental impact. Further improvements in such turbines are highly desired, for these reasons.

SUMMARY OF THE INVENTION

According to one aspect of the present invention, there is provided a unidirectional hydrokinetic turbine having a water entrance end and a water exit end defining a direction of water flow through the turbine, comprising a generally cylindrical accelerator shroud that has a wall cross-section that defines within its cylindrical cross-section a water flow area that contains structure located therein that consists essentially of an integral hydrokinetic force-generating member comprising a center hub member having an asymmetrical hydrofoil profile; and a plurality of blade members mounted on the hub member, wherein the force-generating member is mounted for rotation on the inner surface of the accelerator shroud. Preferably, the hydrokinetic force-generating member comprises a rotor assembly that further includes a rotor outer ring to which the blade tips are attached and which has an outer circumference that is configured for rotation within the accelerator shroud. Preferably, the hub member comprises a generally round profile member having an open center and wherein the wall members surrounding the open center form an asymmetric hydrofoil profile, with the extrados being toward the outside of the turbine and the intrados facing toward the center of the hub. Also, the blades preferably have an asymmetrical hydrofoil-shaped cross-sectional configuration, with the blades most preferably having a cord length at their radially outer ends that is greater than the cord length at their radially inner ends, and a profile/cord thickness at their radially outer ends that is greater than the profile thickness at their radially inner ends. It is most preferred that accelerator shroud has a wall cross-section that is also an asymmetrical shape.

According to other preferred embodiments, the unidirectional hydrokinetic turbine has a center hub having a length that extends both forwardly and rearwardly a substantial distance past the edges of the blades, and more preferably extending from the blades forwardly to a first point that is rearward of the water entrance end of the accelerator shroud, and extending rearwardly to a point at least as far as the water exit end of the accelerator shroud. Preferably, the center hub extends a total distance from about 50 to 80%, more preferably from about 60 to 70% and most preferably about ⅔ of the length of the accelerator shroud.

According to other preferred embodiments, the unidirectional hydrokinetic turbine further comprises an annular diffuser comprising a generally cylindrical ring member that has a wall cross-section, also preferably comprising an asymmetrical hydrofoil shape, the annular diffuser having a diameter greater than the diameter of the accelerator shroud and being positioned behind the main accelerator shroud, in the direction of water flow through the turbine, preferably in an overlapping relationship.

According to another aspect of the present invention, there is provided a unidirectional hydrokinetic turbine having a water entrance end and a water exit end defining a direction of water flow through the turbine, comprising a generally cylindrical accelerator shroud that has a wall cross-section that comprises an asymmetrical hydrofoil shape, wherein the hydrofoil shape comprises a generally S-shaped profile in which the outer surface comprises a forward convex portion and a rearward concave portion that transitions into the forward convex portion, and the inner surface comprises a rearward convex portion and a forward portion that has a shape that is either straight or concave and transitions into the rearward convex portion; and a rotor assembly that is mounted for rotation within the accelerator shroud around an axis that is generally parallel to the direction of water flow through the turbine, the rotor assembly comprising a plurality of rotor blades extending radially outwardly from the center of the turbine and being mounted for rotation within the accelerator shroud. Preferably, the rotor assembly further comprises a center hub member, preferably with a generally round profile member having a hydrofoil profile, and the rotor blades are attached to the hub member. More preferably, the hub member comprises a generally round profile member having an open center, with the wall members surrounding the open center forming an asymmetric hydrofoil profile, with the extrados being toward the outside of the turbine and the intrados facing toward the center of the hub.

In some preferred embodiments, the rotor member further comprises a rotor outer ring to which the blade tips are attached and which has an outer circumference configured for rotation within the accelerator shroud. In other preferred embodiments, the unidirectional hydrokinetic turbine further comprises an annular diffuser comprising, a generally cylindrical ring member that has a wall cross-section that also comprises an asymmetrical hydrofoil shape, the annular diffuser having a diameter greater than the diameter of the accelerator shroud and being positioned behind the main accelerator shroud, in the direction of water flow through the turbine, preferably in overlapping relationship.

According to another aspect of the present invention, there is provided a unidirectional hydrokinetic turbine having a water entrance end and a water exit end defining a direction of water flow through the turbine, comprising a generally cylindrical accelerator shroud that has a wall cross-section that comprises an asymmetrical hydrofoil shape and defines within its cylindrical cross-section a flow area, where the hydrofoil shape serves to accelerate the flow of water through the accelerator shroud and to create a negative pressure field behind the accelerator shroud, in the direction of water flow; a rotor assembly that is mounted for rotation within the accelerator shroud around an axis that is generally parallel to the direction of water flow through the turbine, the rotor assembly comprising a generally elongated cylindrical center hub having and a wall cross-section comprising a hydrofoil shape; a plurality of rotor blades fixed to and extending radially outwardly from the center hub wall for rotation therewith and terminating at rotor blade tips, which blades have an asymmetrical hydrofoil-shaped cross-sectional configuration; and a rotor outer ring to which the blade tips are attached and having an outer circumference which is configured for rotation within the accelerator shroud: and an annular diffuser comprising, a generally cylindrical ring member that has a wall cross-section comprising an asymmetrical hydrofoil shape. The annular diffuser has a diameter greater than the diameter of the accelerator shroud and is positioned behind the main accelerator shroud, in the direction of water flow through the turbine, preferably in overlapping relationship, whereby the hydrofoil shape of the annular diffuser serves to accelerate the flow of water through the annular diffuser and to create a negative pressure field behind the annular diffuser, and in cooperation with the hydrofoil shape of the accelerator shroud, the hydrofoil shaped rotor hub and the blades, to augment acceleration of water flow through the accelerator shroud at the location of the rotor assembly.

In some preferred embodiments of the unidirectional hydrokinetic turbine, the blades have a chord length at their radially outer ends that is greater than the chord length at their radially inner ends and/or the blades have a profile/cord thickness at their radially outer ends that is greater than the profile/cord thickness at their radially inner ends. In other preferred embodiments, the center hub comprises a generally round profile member having an open center, wherein the wall members surrounding the open center form a asymmetric hydrofoil profile, with the extrados being toward the outside of the turbine and the intrados facing toward the center of the hub. Preferably, the center hub has a length that extends both forwardly and rearwardly a substantial distance past the edges of the blades, more preferably the center hub extends from the blades forwardly to a first point that is rearward of the water entrance end of the accelerator shroud, and extends rearwardly to a point at least as far as the water exit end of the accelerator shroud. Preferably, the center hub extends a total distance from about 50 to 80%, more preferably from about 60 to 70% and most preferably about ⅔ of the length of the accelerator shroud. It may also extend rearwardly beyond the rear edge of the accelerator shroud.

According to still another aspect of the present invention, there is provided a unidirectional hydrokinetic turbine having a water entrance end and a water exit end defining a direction of water flow through the turbine, comprising a generally cylindrical accelerator shroud section that defines within its cylindrical cross-section a water flow area; a rotor assembly that is mounted for rotation within the accelerator shroud around an axis that is generally parallel to the direction of water flow through the turbine, the rotor assembly comprising a plurality of rotor blades extending radially outwardly from the center of the turbine and a wildlife and/or debris deflector member mounted at the water entrance end of the accelerator shroud, the deflector comprising a generally conically-shaped structure which is tapered toward its forward/narrow end and comprises an array of deflector rods that run parallel to each other and are spaced essentially evenly at a pre-determined distance over their full-length with respect to one another, whereby the predetermined distance defines the maximum size of wildlife or an object that can pass through the deflector. Preferably, the wildlife and/or debris deflector member includes at its forward/narrow end a ring member to which the deflector rods are attached, the ring having a diameter no larger than the pre-determined distance of the deflector rods. In other preferred embodiments, the ring member and/or at least some and preferably all of the deflector rods have a hydrofoil-shaped cross-section in order to reduce turbulence in the water flowing across the ring and/or deflector rods.

According to another aspect of the present invention, there is provided a unidirectional hydrokinetic turbine having a water entrance end and a water exit end defining a direction of water flow through the turbine, comprising a generally cylindrical accelerator shroud that has a wall cross-section comprising a generally asymmetrical hydrofoil shape, which serves to accelerate the flow of water through the main accelerator shroud and to create a negative pressure field behind the accelerator shroud, in the direction of water flow, and that defines within its cylindrical cross-section a water flow area that contains an integral hydrokinetic force-generating member comprising a center hub member having an asymmetrical hydrofoil profile, and a plurality of blade members mounted on the hub member, wherein the force-generating member is mounted for rotation on the inner surface of the accelerator shroud. The turbine is characterized by its ability to accelerate the ambient flow velocity of the water entering the turbine to a flow velocity at the blade members that is at least about twice the ambient flow velocity, preferably at least about 2½ times and most preferably at least about 3 times. Furthermore, the turbine is characterized by its ability to provide an increase in power output, compared to conventional hydrokinetic turbines of equal diameter, by a factor of at least about 25%, preferably by at least about 50% and most preferably by at least about 80%.

According to still another aspect of the present invention, there is provided a shroud that is designed for use in a unidirectional hydrokinetic turbine having a water entrance end and a water exit end defining a direction of water flow through the turbine. The accelerator shroud comprises a generally cylindrical accelerator shroud that has a wall cross-section comprising a generally asymmetrical hydrofoil shape, wherein the hydrofoil shape comprises a generally S-shaped profile in which the outer surface comprises a forward convex portion and a rearward concave portion, and the inner surface comprises a rearward convex portion and a forward portion that has a shape that is either straight or concave. This unique configuration serves to accelerate in an optimum manner the flow of water through the main accelerator shroud and to create a negative pressure field behind the accelerator shroud, in the direction of water flow.

According to yet another aspect of the present invention, there is provided a unidirectional hydrokinetic turbine having a water entrance end and a water exit end defining a direction of water flow through the turbine, comprising a generally cylindrical accelerator shroud that has a wall cross-section that comprises an asymmetrical hydrofoil shape; and a rotor assembly that is mounted for rotation within the accelerator shroud around an axis that is generally parallel to the direction of water flow through the turbine, the rotor assembly comprising a plurality of rotor blades extending radially outwardly from the center of the turbine and a rotor outer ring to which the blade tips are attached for rotation within the accelerator shroud, wherein the blades have an asymmetrical hydrofoil-shaped cross-sectional configuration, with the blades most having either a cord length at their radially outer ends that is greater than the cord length at their radially inner ends, and/or a profile/cord thickness at their radially outer ends that is greater than the profile thickness at their radially inner ends.

Preferably, the rotor assembly further comprises a center hub member, preferably with a generally round profile member having an asymmetrical hydrofoil profile, and the rotor blades are attached to the hub member. More preferably, the hub member comprises a generally round profile member having an open center, with the wall members surrounding the open center forming an asymmetric hydrofoil profile, with the extrados being toward the outside of the turbine and the intrados facing toward the center of the hub.

According to still another aspect of the present invention, there is provided a wildlife and/or debris deflector member that is designed for use in a hydrokinetic turbine. The wildlife and/or debris deflector member is designed to be mounted at either end or both ends of a turbine. The deflector comprises a generally conically-shaped structure which is tapered toward one end and comprises an array of deflector rods that run parallel to each other and are spaced essentially evenly at a pre-determined distance over their full-length with respect to one another, whereby the predetermined distance defines the maximum size of wildlife or an object that can pass through the deflector. Preferably, the wildlife and/or debris deflector member includes at its narrower end a first ring member to which the deflector rods are attached, the first ring having a diameter no larger than the pre-determined distance. Similarly, the deflector preferably has at or near its wider end a second ring member to which the deflector rods are attached. In other preferred embodiments, at least some and preferably all of the deflector rods and/or rings have a hydrofoil-shaped cross-section.

In accordance with another aspect of the present invention, there is provided a method for designing a unidirectional hydrokinetic turbine having a water entrance end and a water exit end defining a direction of water flow through the turbine, comprising designing a generally cylindrical accelerator shroud that has a wall cross-section that comprises an initial asymmetrical hydrofoil shape and defines within its cylindrical cross-section a flow area, where the hydrofoil shape is selected based on fluid dynamics principles to serve to accelerate the flow of water through the accelerator shroud and to create a negative pressure field behind the accelerator shroud, in the direction of water flow; designing a rotor assembly that is mounted for rotation within the accelerator shroud around an axis that is generally parallel to the direction of water flow through the turbine, the rotor assembly comprising (i) a generally elongated cylindrical center hub having and a wall cross-section comprising an initial hydrofoil shape that is selected based on fluid dynamics principles; (ii) a plurality of rotor blades fixed to and extending radially outwardly from the center hub wall for rotation therewith and terminating at rotor tips, which blades have an initial asymmetrical hydrofoil-shaped cross-sectional configuration that is selected based on fluid dynamics principles; and (iii) a rotor outer ring to which the blade tips are attached and having an outer circumference which is configured for rotation within the accelerator shroud; designing an annular diffuser comprising a generally cylindrical ring member that has a wall cross-section comprising an initial asymmetrical hydrofoil shape that is selected based on fluid dynamics principles, wherein the annular diffuser has a diameter greater than the diameter of the accelerator shroud and is positioned behind the main accelerator shroud, in the direction of water flow through the turbine, preferably in overlapping relationship; and modifying the initial hydrofoil shapes of the annular accelerator, the center hub, the rotor blades and the annular diffuser, in response to CFD testing/analysis of a turbine design comprising such components, in such a way as to provide final hydrofoil shapes for all of these components that (a) at least enhance, and preferably optimize the ability to accelerate the flow of water through the annular diffuser and to create a negative pressure field behind the annular diffuser, and (b) provide cooperation with the final hydrofoil shapes of the accelerator shroud, the rotor hub and the blades, to at least enhance, and preferably optimize acceleration of water flow through the accelerator shroud at the location of the rotor assembly.

Further features and advantages of the present invention will become apparent from the detailed description of preferred embodiments that follows, when considered together with the accompanying figures of drawing.

BRIEF DESCRIPTION OF THE DRAWINGS

The following is a brief description of the drawings, which are presented for the purpose of illustrating the disclosure of certain preferred embodiments of the invention set forth herein and not for the purpose of limiting the same.

FIG. 11 is a schematic side view of the rotor section of FIG. 8, showing one of the hydrofoil shaped rotor blades, the rotor blade shroud and the hydrofoil shaped center hub;

FIG. 12 is a perspective view of four rotor blades alone in the embodiment of FIG. 8;

FIG. 12A is an isolate perspective view of a single exemplary rotor blade;

FIG. 34 is a schematic side view and front view of a rotor blade optimized for a 1.5 m rotor section diameter turbine to be used in a 3 kn current;

FIGS. 37A and 37B illustrate 2-D test results of CFD analysis of flow acceleration, in velocity and in pressure, respectively, of an embodiment according to the invention.

DETAILED DESCRIPTION OF PREFERRED EMBODIMENTS OF THE INVENTION

Figure 1:
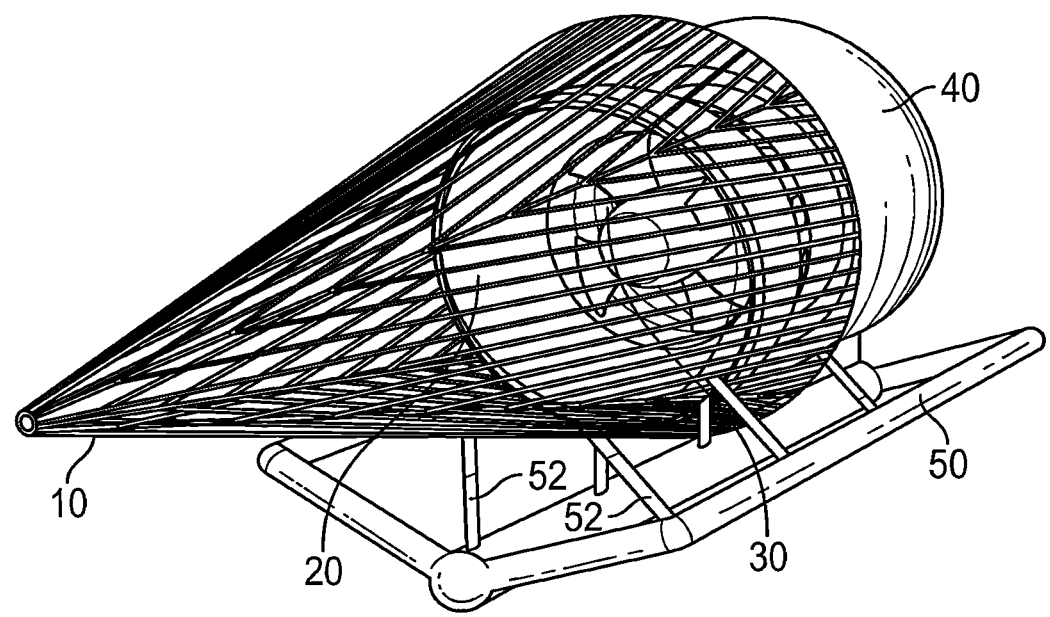
FIG. 1 is a three-dimensional front view of one embodiment of a hydrokinetic turbine with support/mounting structure.
Figure 2:
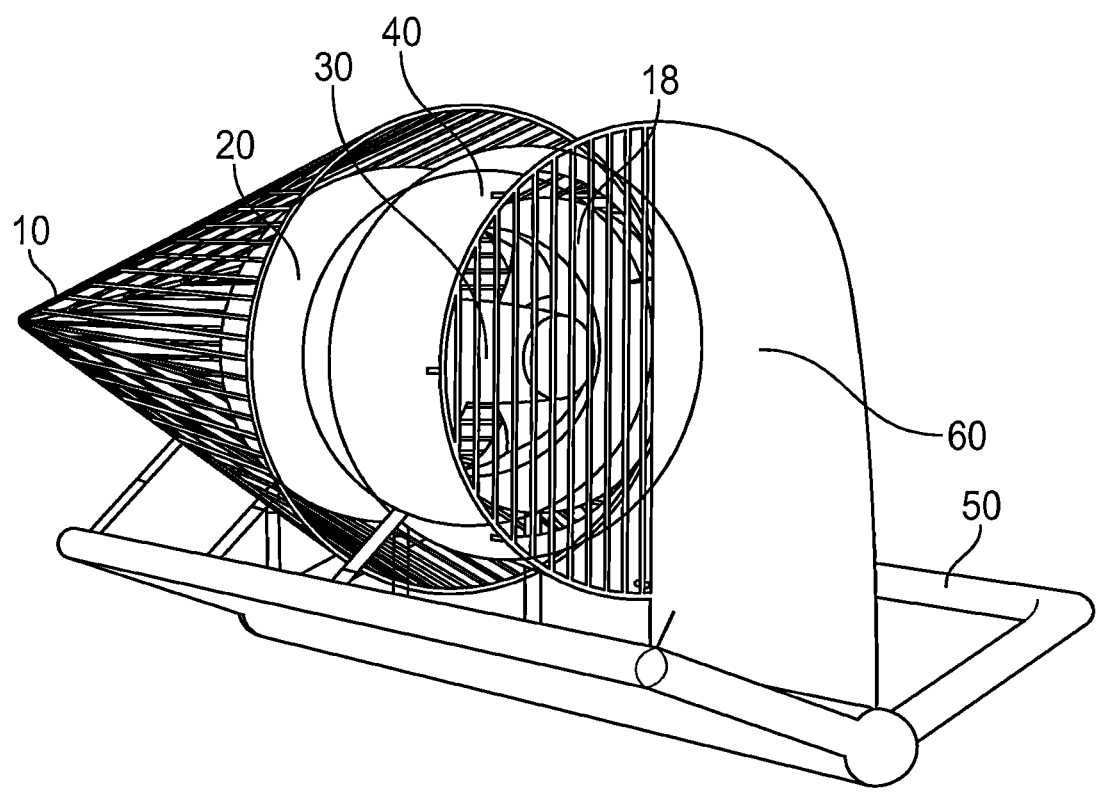
FIG. 2 is a three-dimensional rear view of the hydrokinetic turbine of FIG. 1, with support/mounting structure.
Figure 3:
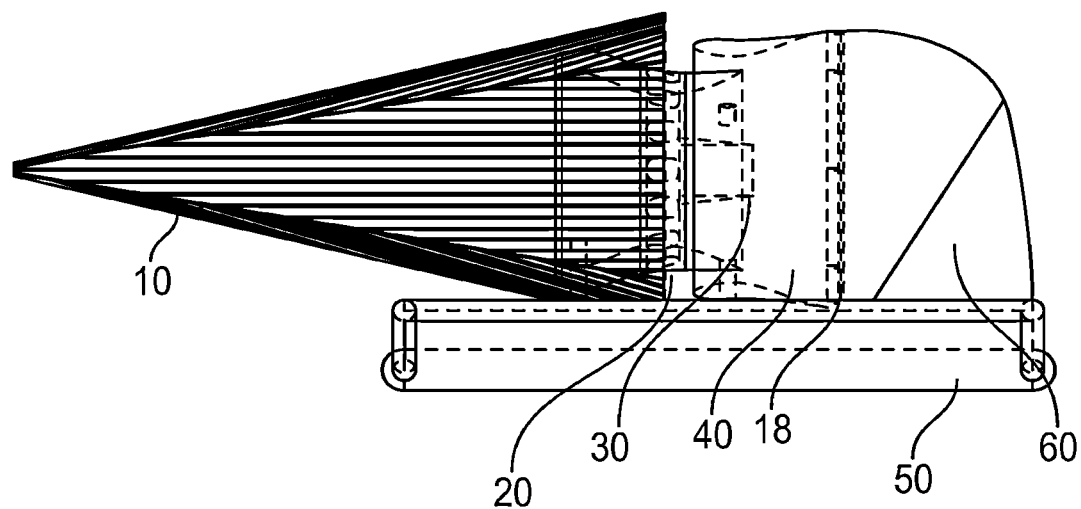
FIG. 3 is a cross-sectional side view of the hydrokinetic turbine of FIG. 1, with support/mounting structure.
Figure 4:
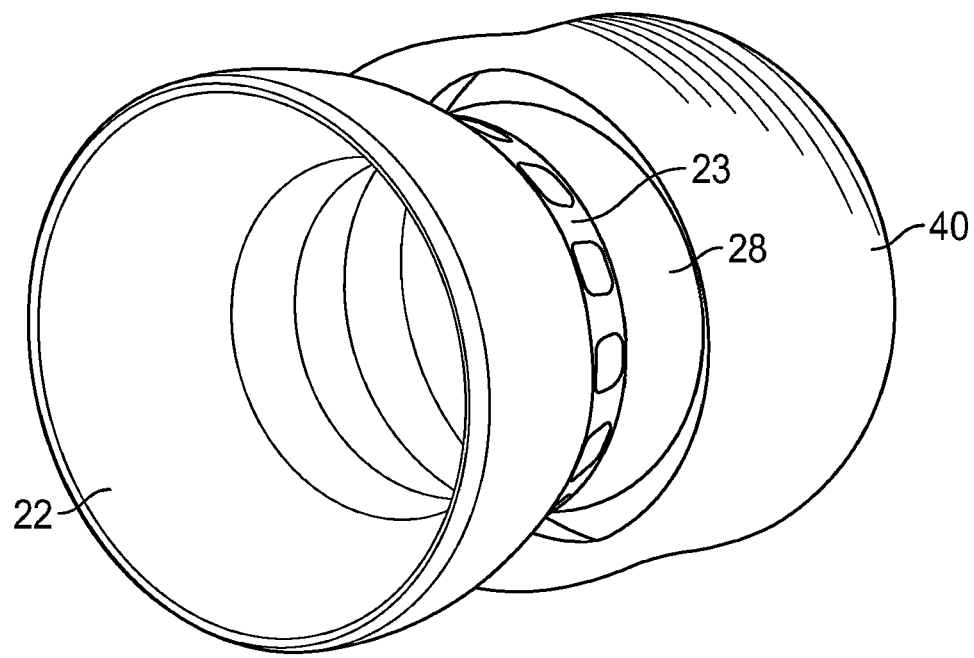
FIG. 4 is a three-dimensional view of one embodiment of an accelerator shroud with annular diffuser.
Figure 5A:
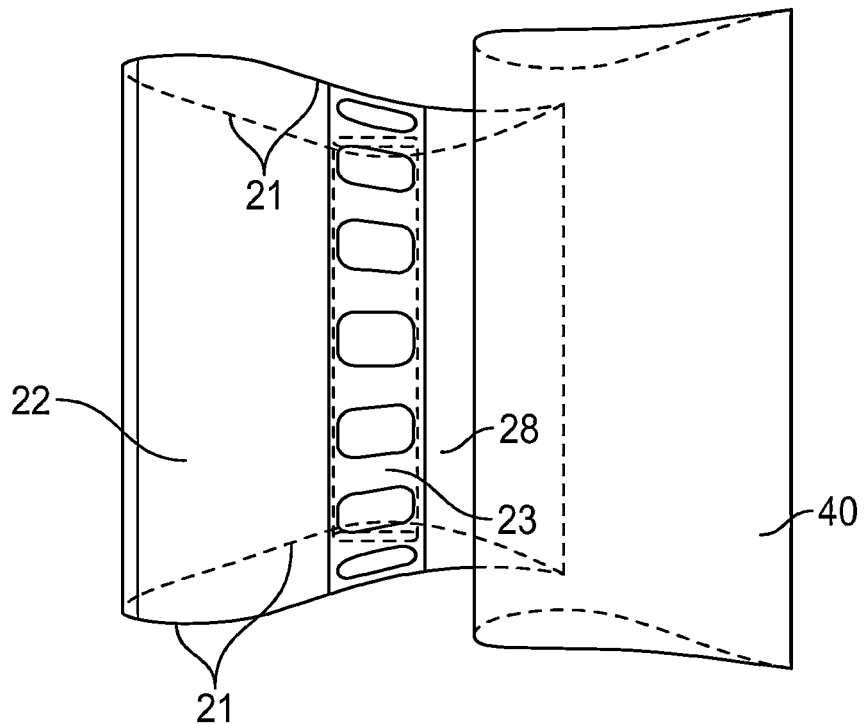
FIG. 5A is a partial cross-sectional view of an S-shaped/double-curved hydrofoil accelerator shroud, in an arrangement as shown in FIG. 4, with annular diffuser.
Figure 5B:
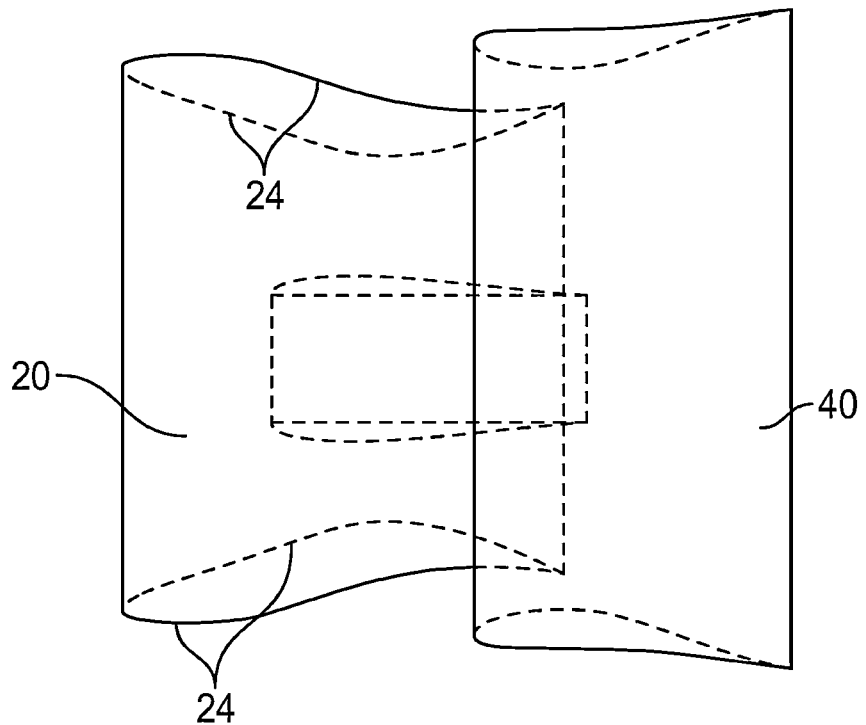
FIG. 5B is a partial cross-sectional view of a non-S-shaped hydrofoil accelerator shroud, in an arrangement as shown in FIG. 4, with annular diffuser.

The devices according to the invention are characterized by a unique flow acceleration system and other unique components, with no central shaft or gears and, as a result of these and other features, can operate at a higher efficiency level than other comparable turbines.

The designs of the hydrokinetic turbines of the invention are readily scalable in size, which means they can easily be adapted and optimized for any specific geographic area and for different flow speeds and flow volumes.

The present invention includes several different installation methods, making the device suitable for usage in many different types of locations and conditions with any navigable water depth.

The turbines of the invention are designed to be very environmentally friendly and to have practically zero impact on marine life, the seabed or riverbed and its surroundings. They are preferably equipped with wildlife and debris excluder, a safe passage or way through for small marine life and electro-magnetic radiation (EMF) shielding. The exterior is preferably painted with non-toxic anti-fouling coating.

Due to the unique design, materials used in the construction and coatings applied, these devices require minimal maintenance.

The present invention, in one aspect, relates to a hydrokinetic turbine intended to be placed underwater, in a fixed, floating, anchored or towed configuration, in a stream of water flow that preferably has a minimum flow speed of about 0.25 m/s. The invention also relates to certain turbine components, to a method for designing/producing such turbines, as well as to a method of using same. Of course this device will produce more energy with greater flow speeds.

These turbines may be installed in any numbers. They may be used as single units or may be installed as a "turbine array" or a "turbine farm" that may consist of multiple turbines and may be up to hundreds of units. The turbines may be generating electricity together or separately.

The design of these turbines is scalable and may be produced as a small unit of any size, but practically speaking, at least about 30 cm of rotor section diameter, and may be any size of rotor section diameter that is practical and appropriate for a particular application at a specific location. The device may be a large unit of any size up to at least about 30 m of rotor section diameter or more.

The invention provides an improved flow acceleration system developed by Applicant, that uses hydrofoil shapes on many of the key components of the turbine and most preferably on most or all of the components over which or through which the water flows. These components that may be hydrofoil shaped are called: the rotor blades (34), the center hub (36), the rotor blade shroud (38), the accelerator shroud (20), annular diffuser (40), the wildlife and debris excluder (10, 18), the tail rudder (60), the support structure (50, 52), the support piling (54). Some of these components, such as the rotor blades or the accelerator shroud, can advantageously be hydrofoil shaped in order to optimize the extraction of energy, while other components such as the wildlife and debris excluders may be hydrofoil shaped in order to reduce or eliminate turbulence that could negatively affect another component or components.

The hydrodynamic principles that apply to this design are valid for any size to which this hydrokinetic turbine is scaled and whatever the flow speed of the water is. With appropriate change in the shapes of these hydrofoil shaped components, this hydrokinetic turbine can be adapted and optimized to the flow conditions of a specific site and to the size of turbine required. The changes to the hydrofoil shapes are advantageously made to one or more of the rotor blades, the accelerator shroud, the center hub and/or the annular diffuser. The changes, which in some cases can be relatively small and may consist in increasing or decreasing the cord length and/or the cord thickness of some hydrofoils and/or changing the angle of attack/incidence of the hydrofoils according to the speed of the water flow and the required size of the turbine. This means that the design of specific embodiments according to the invention may change relatively or even very little in appearance, but will work exactly the same way regardless of the size of the turbine or speed of the water flow, as long as the proportions in size and position of the components relative to each other and the position between the individual parts are maintained and remain unchanged or very similar.

The output of the turbine will increase in proportion with the surface area of the rotor blades; this means that the driving force that determines how many kilowatts or megawatts a turbine produces is not in proportion to its diameter, but in proportion of the surface area of the rotor blades exposed to the water current. The output of a turbine increases by the square of the diameter; in other words a turbine that is twice as big in diameter will put out four times the electrical power. This property of the design makes the turbine scalable to almost any size that is practical and usable in a body of water with changes to the hydrofoil shapes which are often relatively minor changes.

The design and the use of these particular shapes of the hydrofoil parts do not only eliminate the tip vortex of the rotor blades but also accelerate water flow through the rotor section of the turbine due to the fact that the accelerator shroud, in combination with the annular diffuser, creates an area of low pressure at the exit of or behind the turbine that is preferably further amplified by the hydrofoil shaped center hub. These components together create a synergy to increase the water flow even more. The water flow that is already slightly accelerated at the entrance of the turbines through the funneling effect of the entrance duct is further accelerated by this low-pressure area behind the turbine that creates a suction to pull the water through the rotor section from behind at even greater speed. In the case of the preferred use of the hydrofoil shape of the parts, the designs according to the invention achieve a very large increase in flow speed through the rotor section of the turbine where the hydrofoil shaped blades are positioned. No other known hydrokinetic turbine design has achieved this degree of flow acceleration.

The flow acceleration created by the unique shapes and combination of all the hydrodynamic elements remains the same at any size of turbine. Computational fluid dynamic analysis of the designs of hydrokinetic turbines according to the invention has proven that they accelerate the flow speed through the rotor section to as much as about three times the speed of the ambient flow speed surrounding the outside of the turbine. This means that, for example, if this device was placed in a 3 kn current the flow speed the through the rotor section of this device would be up to 9 kn. The very significant advantages of this increased current to the production of hydroelectric power are clearly apparent.

The effects of each individual part as well as the effects of interaction/cooperation and relation of the parts to one another are described in detail below, in connection with several exemplary embodiments of the invention, with reference to the accompanying Figures of drawing.

LIST OF PARTS 10 forward wildlife and debris excluder
12 forward ring of excluder for attachment of the deflector rods
14 hydrofoil shaped deflector rods
15 distance between deflector rods
16 rear/aft ring of the excluder for attachment of the deflector rods
18 rear/aft wildlife and debris excluder
20 complete accelerator shroud
21 S-shaped/double-curve of hydrofoil shape accelerator shroud cross-section
22 entrance duct/forward fairing of accelerator shroud
23 stator housing/center section of the accelerator shroud
24 non-S-shaped hydrofoil shape accelerator shroud cross-section metallic windings of the stator
26 9 roller/ball bearings (3 thrust bearings forward, 3 thrust bearings aft, 3 alignment bearings)
28 aft fairing/aft section of accelerator shroud
29 feather edge of accelerator shroud
30 complete main rotor section with hydrofoil shaped blades, rotor blade shroud with recess for permanent magnet installation, hydrofoil shaped center hub
32 ring of permanent magnets mounted in recess on rotor section
33 tip of rotor blades
34 hydrofoil shaped rotor blades
35 cross-sections of hydrofoil shapes of rotor blades
36 hydrofoil shaped center hub
37 open center of main rotor section
38 rotor blade shroud with recess for permanent magnet installation
39 root of rotor blades
40 annular diffuser with hydrofoil shaped cross-section
42 $2^{nd}$ annular diffuser
44 $3^{rd}$ annular diffuser
50 tubular support structure for various mounting purposes
51 hydrofoil shaped attachment rods between turbine components and support structure
52 support piling for pivoting
53 waterproof plug for removal, rings and brushes for pivoting inside piling
54 floating raft or ocean barge
55 support structure for rotating on a raft/barge installation
56 cranes for turbine rotation on raft/barge installation
58 submersible raft for buoyant installation
59 seabed mooring or screw-type anchor
60 turbine tail rudder to orient turbine into the direction of the water flow
62 winglets attached the turbine for towing installation
64 fixed tether and mooring for barge/raft mounted installation or buoyant installation 66 rolling tether to submerge turbine by shortening or lengthening for surfacing
72 incidence/angle of attack of hydrofoil blade
74 cord of hydrofoil/length of cord
75 length of rotor blade
76 thickness of hydrofoil cross-section/shape
78 twist of rotor blade/change of incidence
80 solid/bulbous center hub
82 hydrofoil shaped vanes to support that position solid center hub
83 diameter of diffuser entrance
84 diameter of accelerator shroud entrance
85 overall diameter of center hub
86 profile/cord thickness of center hub
87 length of accelerator shroud
88 length of diffuser
89 length of center hub
90 profile/cord thickness of accelerator shroud
91 profile/cord thickness of diffuser
92 diameter of center hub exit
93 diameter of accelerator shroud exit
94 diameter of diffuser exit
95 flow direction The invention is preferably composed of four main components, a) a flow accelerator shroud, b) an optional annular diffuser following the flow accelerator shroud, c) a main rotor which is built into the accelerator shroud but is a separate part, and d) one or more optional wildlife/debris excluders. Some of these components typically comprise several different sub-parts that are assembled to be one part of the turbine. Additional features and advantages are described below. These parts and features cooperative with and have an effect on one another in ways that are also described below to produce the improved operation of the turbines according to the invention.

The Flow Accelerator Shroud with the Annular Diffuser

Figure 9:
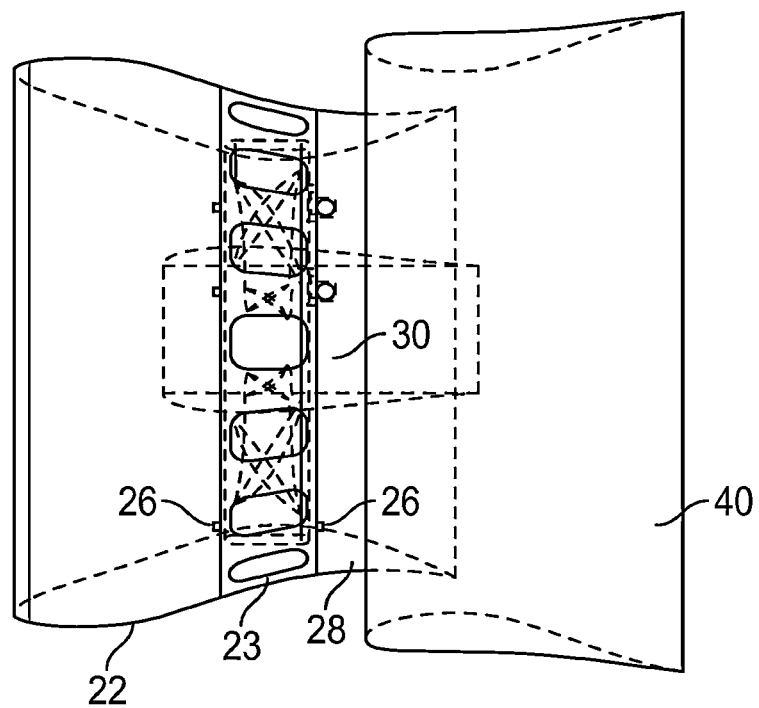
FIG. 9 is a cross-sectional view the entire turbine of FIG. 8, with central rotor section in place.
Figure 9A:
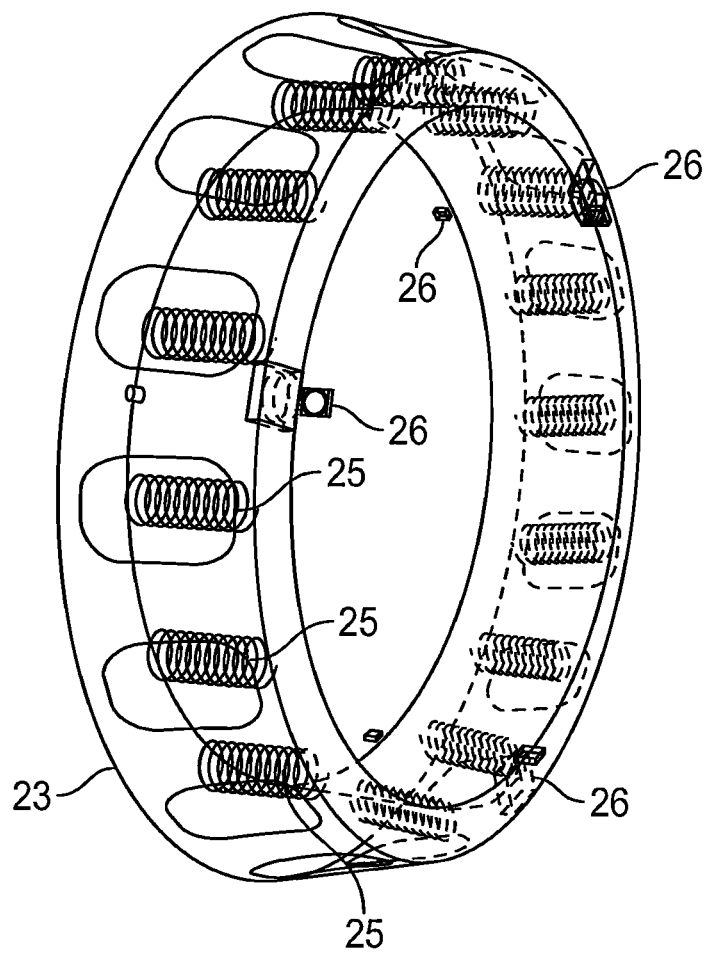
FIG. 9A is an isolated perspective view of the accelerator shroud, schematically showing the placement of coils
Figure 10:
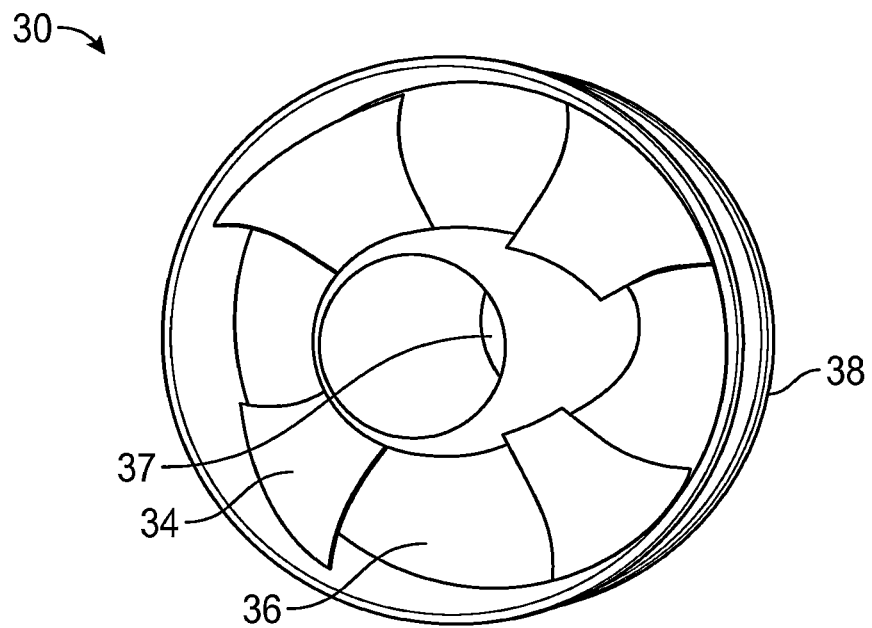
FIG. 10 is a three-dimensional view of the rotor section alone of the embodiment of FIG. 8.
Figure 21:
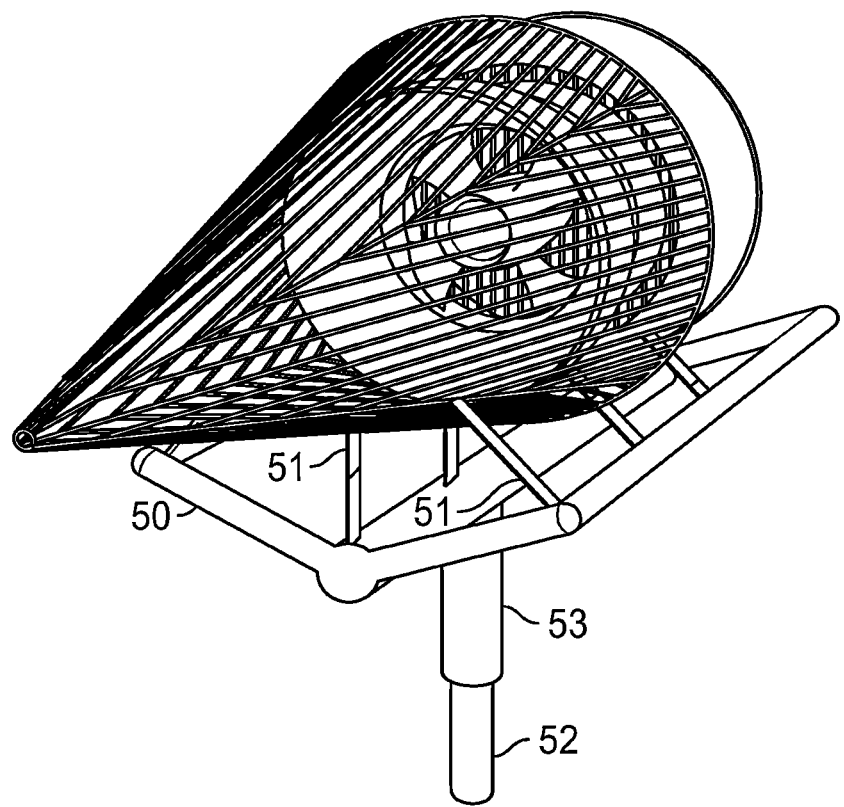
FIG. 21 is a perspective view of one embodiment of a piling-mounted hydrokinetic turbine mounted on a pivoting pedestal.
Figure 24:
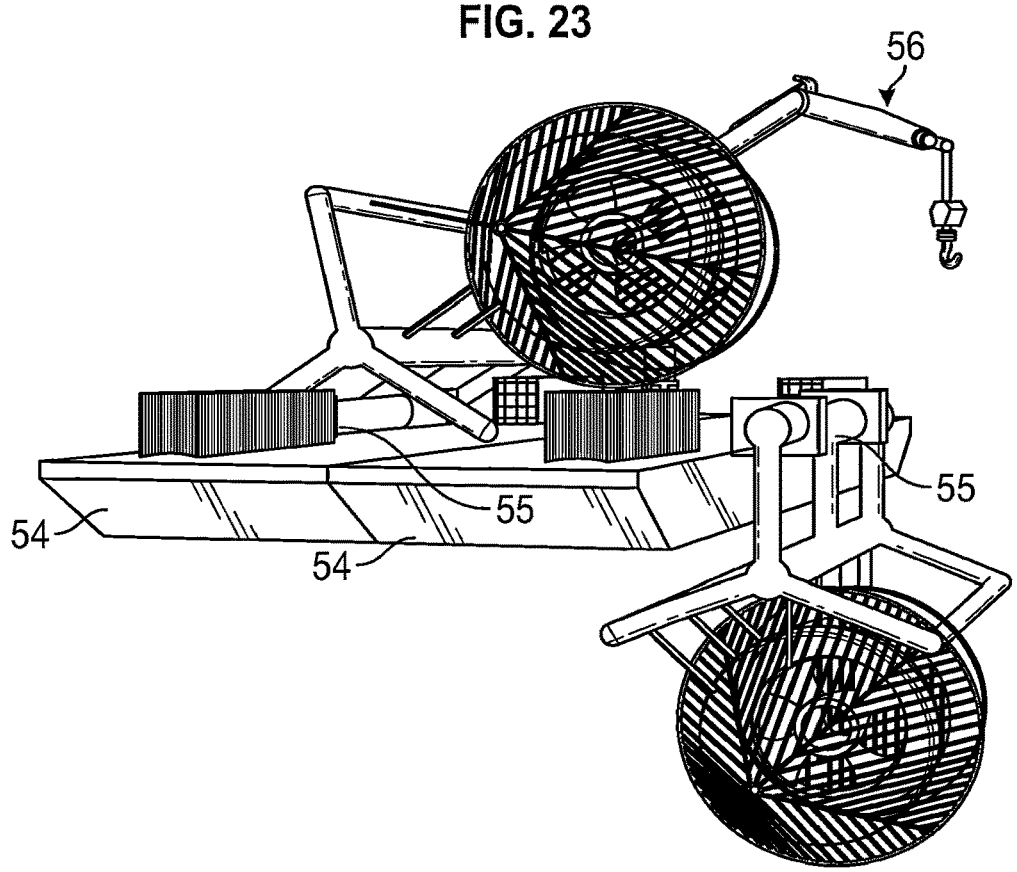
FIG. 24 is a schematic perspective view of a raft-mounted hydrokinetic turbine installed on an ocean barge with port side turbine operating, and with starboard side turbine in maintenance position.

Referring now to FIGS. 1-5, 8 and 19, the flow accelerator shroud (20) is an important part that embodies the most complex hydrofoil shape. As used in the designs of this invention, it preferably has an asymmetrical hydrofoil shape and most preferably an S-shaped/double-curved hydrofoil shape (FIG. 5*a*, 21), or in other words a generally S-shaped double-curved configuration (FIG. 9), to create a negative pressure field behind the shroud in order to accelerate the water flow through the rotor section (30) of the turbine. The cross-section of the wall of the accelerator shroud may also be a hydrofoil shape that is not an S-shaped double-curved, but resembles much more conventional hydrofoil shapes (FIG. 5*b*, 24). The accelerator shroud accelerates the flow of the water on the inside of the turbine in comparison to the ambient flow speed around outside the accelerator shroud. The accelerator shroud is preferably composed of four pieces: entrance duct (22), the stator housing (24), the rotor blade shroud (38) (FIG. 10) and the aft fairing (28). These four components together preferably form a single shape, which is preferably the asymmetrical hydrofoil of the accelerator shroud, which in certain preferred embodiments has the S-shaped/double-curved hydrofoil shape. All four pieces are preferably faired together to form a perfectly smooth surface both inside and outside, over which the water flows without creating any significant turbulence.

The entrance duct (22) serves to funnel the water flow into the rotor section (30) and to lead the water flow onto and over the stator housing (24) on the outside of the accelerator shroud and over the rotor blade shroud (38) on the inside. This stator housing exterior surface and the rotor blade shroud interior surface are part of the overall shape of the accelerator shroud. The entrance duct also contains the forward thrust bearings that guide the rotor section during operation.

The stator housing (24) contains all the metallic, preferably copper, coils (25) that comprise the stator of the annular generator, as well as the conventional electrical wiring (not shown) to convey the electrical energy generated out of the turbine. The stator housing also contains the rotational roller/ball bearings (or other bearings or low friction polymer bushings) (26) on which the rotor section rotates.

The exterior surface of the rotor blade shroud (38) forms part of the accelerator shroud but is a separate part that is attached to the rotor blade tips (33) and rotates with the main rotor inside the accelerator shroud. It is described in more detail below.

The aft fairing (28) located behind the stator housing (24) and rotor blade shroud (38) leads the water flow to the exit of the accelerator shroud (20) and preferably has a feather edge (29) on the back end to avoid creating any turbulence or drag. The aft fairing also contains the aft/rearward thrust bearings (26) (FIG. 9) against which the rotor section is pushed while rotating.

Figure 6:
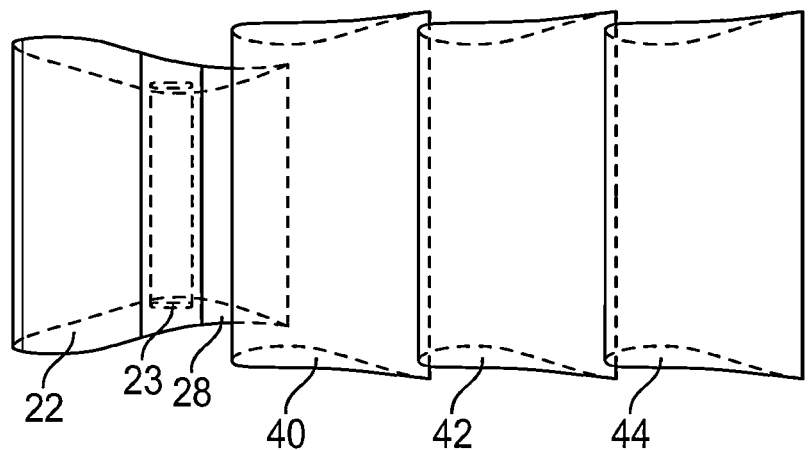
FIG. 6 is a partial cross-sectional view of another embodiment of an accelerator shroud, with multiple annular diffusers of similar diameters.
Figure 7:
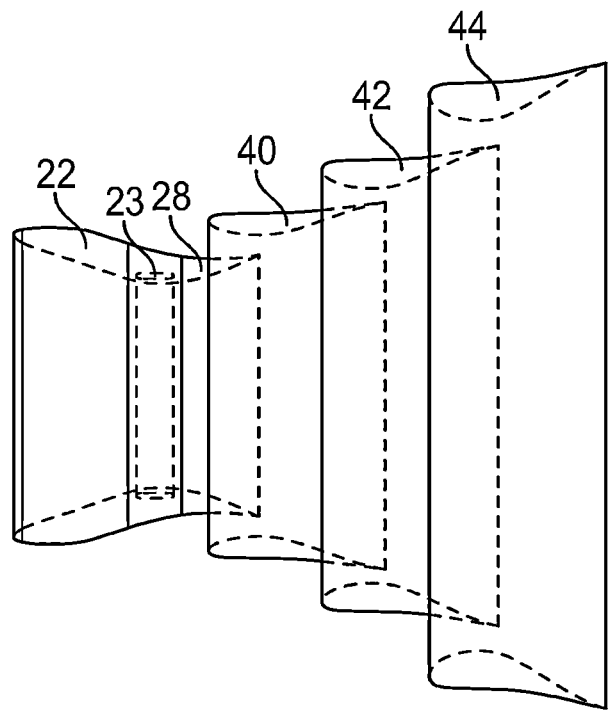
FIG. 7 is a partial cross-sectional view of another embodiment of an accelerator shroud, with multiple annular diffusers with different diameters.
Figure 8:
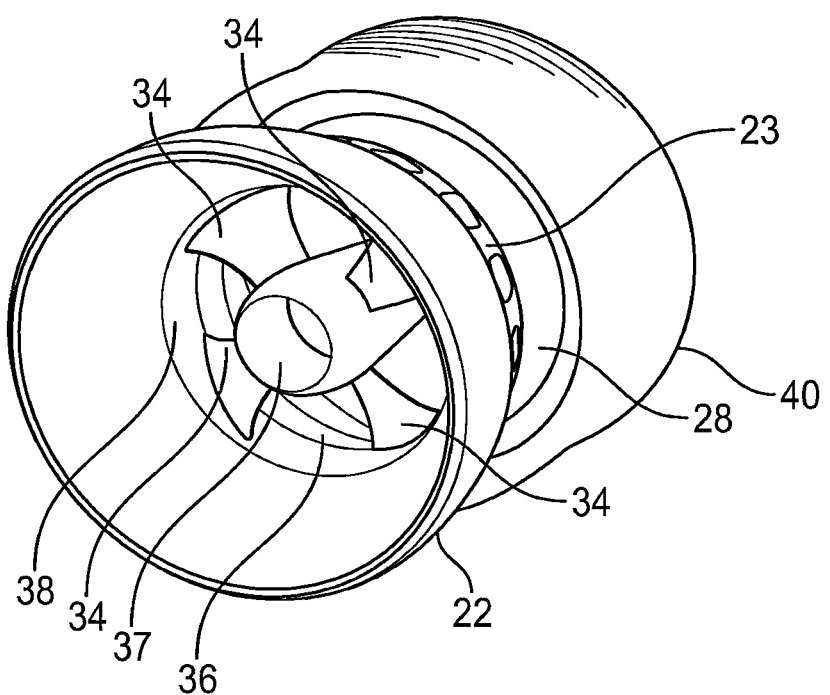
FIG. 8 is a three-dimensional view of one embodiment of an entire turbine with central rotor section.

The annular diffuser (40) is also preferably an asymmetrical hydrofoil shaped ring and preferably has a greater diameter than the accelerator shroud (20). The annular diffuser (40) is located behind the accelerator shroud and preferably overlaps somewhat over the aft end of the accelerator shroud (20). It works in a manner very similar to the accelerator shroud, further increasing the negative pressure field behind the turbine. Because of the cooperation and resulting synergistic effect of the accelerator shroud and the annular diffuser, there is a greater augmentation of flow speed through the rotor section. Generally, at a position relatively closely (e.g., from about 4 to 6 inches) behind the trailing edge of the (final) annular diffuser, which is preferably a feather edge, the rear wildlife and debris excluder is attached. There may be some instances in which it may be advantageous, e.g., specific water flow conditions, to employ one or more annular diffusers, such as second annular diffuser (42) and maybe even a third annular diffuser (44), positioned one behind the other. (FIGS. 6-7)

The Rotor Assembly

Turning now to FIGS. 10-15, the hydrokinetic turbines of the invention preferably have an open center (37). In part, this is advantageous in the designs of the present invention because of the low speed that the blades travel through the water near the center of the rotor section and therefore do not create sufficient lift or enough energy worth extracting. Actually, the center portion generally has a negative effect on the rotor due to the extra drag it creates by a larger wetted surface and additional weight needing to be moved through the water. The extremities of the rotor blades (34) travel through the water at a higher speed and therefore create substantially more lift and allow substantially greater energy extraction. Depending on the size of the turbine, the flow speed at a location of the installation and other site-specific needs, the ratio between open center and blade and hub size can be anywhere from about 40% blade:60% open space, to about 80% blade:20% open space. Turbines according to the invention advantageously use the major portion of the overall diameter along the perimeter of the rotor section to produce lift, typically more than about 60% and more preferably approximately ⅔ of the diameter. This leaves the remaining minor portion, e.g., in a preferred embodiment approximately ⅓ of the overall diameter in the center open (37). Eliminating the center section of the rotor reduces the overall weight of the rotor and also reduces the wetted surface area and drag that a solid profile section would create. Therefore the designs of this invention create a more efficient rotor section that uses a smaller blade area with less weight, with less wetted area and less drag, which can rotate at higher rpm rates and allow more energy to be extracted. There is also a secondary effect that is of further benefit to the wildlife and debris excluder that is described below.

Figure 31:
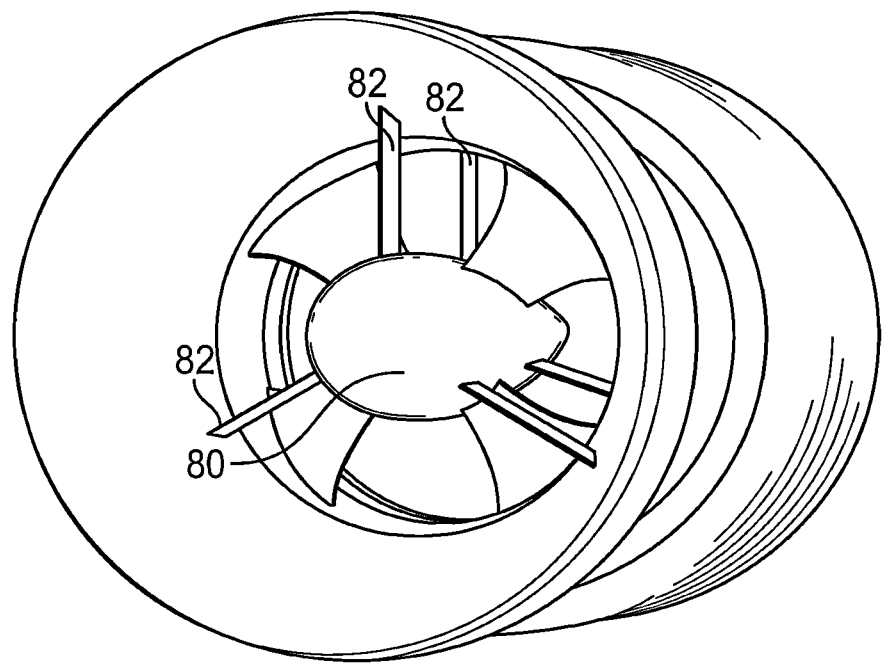
FIG. 31 is a perspective view of a hydrokinetic turbine with a hydrofoil shape solid center hub and hydrofoil shaped vanes to hold the hub in place.
Figure 32:
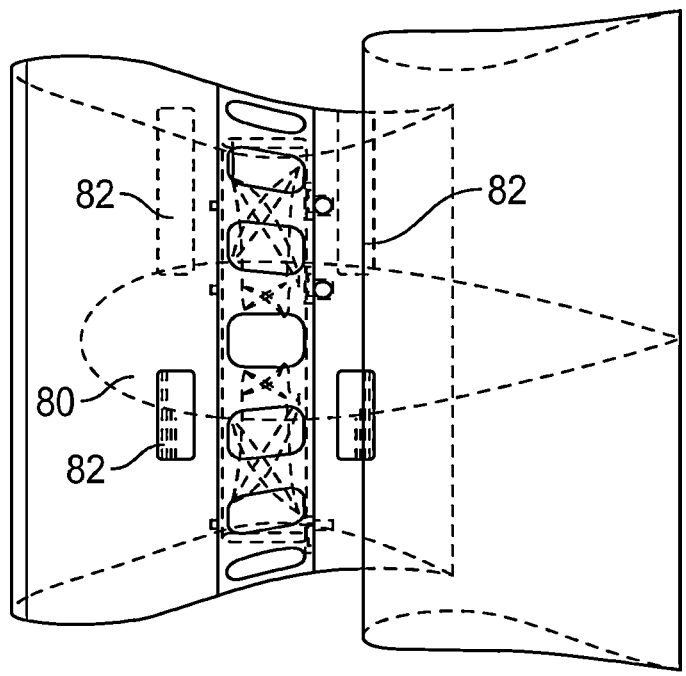
FIG. 32 is a schematic side view of a hydrokinetic turbine with a hydrofoil shaped solid center hub and hydrofoil shaped vanes to hold the hub in place.

The center hub (36, 80), that is preferably annular and surrounds the preferably open center (37), is also used for attaching the rotor blade roots (39). (FIGS. 11-12 and 31) The center hub (80) that is solid preferably has a symmetrical hydrofoil shape, whereas the center hub 36 with open center preferably has an asymmetrical hydrofoil shape, with the extrados being toward the outside of the turbine and the intrados facing toward the center of the hub. The lift created by the center hub helps further increase the negative pressure field behind the turbine created by the accelerator shroud (20) and the annular diffuser (40). This effect increases the acceleration of the water flow through the rotor blade section and contributes to the synergistic effect and resultant higher power generation.

The rotor blade shroud (38) (also called the outer ring of the main rotor) is where the extremities/tips (33) of the blades (34) are attached. (FIG. 10) This rotor blade shroud (38) forms a part of the hydrofoil shape of the accelerator shroud (20). It is a separate element from the accelerator shroud allowing it to rotate with the rotor blades (34), but the surface of the rotor blade shroud is preferably perfectly in line with the inside surface of the accelerator shroud (20) to create one smooth curve of both inside surfaces, accelerator shroud and rotor blade shroud. The outside surface of the rotor blade shroud, which faces the stator housing (24) interior surface, is preferably recessed into the accelerator shroud and has a flat surface where the permanent magnets (32) are located which rotate past the copper coils (25) of the stator to produce the electrical energy. The rotor blade shroud (38) also eliminates tip vortex and reduces drag and turbulence, resulting in higher efficiency and greater energy extraction.

Referring now to FIGS. 11-15, the efficiency of the rotor blades (34) is increased by preferably using an asymmetrical hydrofoil shape, which is also preferably optimized, as explained below. This shape, also called the cord or cross-section (35) of the hydrofoil, results in an increase of the efficiency of each blade, reduces it in size and decreases the number of blades relative to other designs. A smaller rotor blade (34) has less wetted area, thus producing less drag. The amount of lift a hydrofoil shape generates is determined by the shape of cord/cross-section (35) (FIG. 15), the length of cord (74) and the thickness of cord (76) of the hydrofoil. (FIG. 13) In designs according to the invention, one or both, the length of cord (74) and/or the thickness of cord (76) preferably change between the blade root (39) and the blade tip (33). This optimizes the lift created by the hydrofoil shape in relation to the speed it travels through the water. The number of blades put into the rotor section of designs according to the invention may vary depending on the size of the turbine and the flow speed of the water in a particular application.

The angle/incidence (72) (FIG. 13) at which the rotor blades are installed is also a variable that can be adjusted for the purpose of optimizing the angle of attack or incidence of the blade traveling through the water. It is preferred to use an optimum angle which is determined by the rpm of the rotor to produce a laminar or at least a near laminar flow of the water over the blade surface. If this flow is turbulent or significantly non-laminar, the hydrofoil creates less lift, and therefore less energy can be extracted. The tip of the blade travels through the water faster than the root of the blade, due to the fact that it travels a longer distance to complete one rpm. Therefore the incidence of the blade advantageously decreases gradually from the root (39) of the blade to the tip (33) of the blade, in order to be at the optimal angle. This change in angle is called the twist (78) of the blade. The twist is preferably designed to create a rotor blade maximum lift at every cross-section and therefore to increase the efficiency and the power extraction.

In order for hydrofoil shapes according to the invention to be optimal while they travel through the water at different speeds, they preferably have different lengths of cord (74) and different thicknesses of profile/cord (76). Preferably, the thickness (76) of the blade increases and/or the cord length (74) increases from the root of the blade toward the tip of the blade, in order to increase the surface area where the blade travels though the water with higher speed and creates the greatest amount of lift. Thus, the blades most preferably increase in both size and thickness as they extend radially from the hub. These increases in cord length and thickness result in higher efficiency and greater power extraction.

The rotor blades hydrofoil shape (35), the length of cord (74), the thickness of profile/cord (76), the degree of incidence (72), and the twist (78) of each rotor blade, and the number of blades can advantageously be varied for each application, in order to adapt to site-specific flow conditions of the water and other locational needs.

The Wildlife and Debris Excluder(s)

Figure 16:
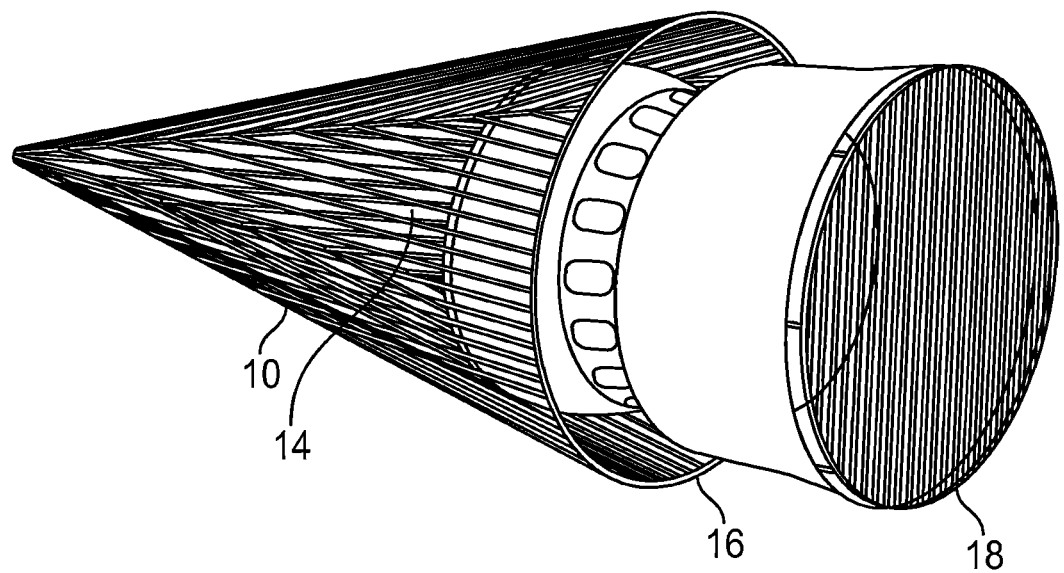
FIG. 16 is a perspective view of one embodiment of a turbine with front and rear wildlife and debris excluders.
Figure 17:
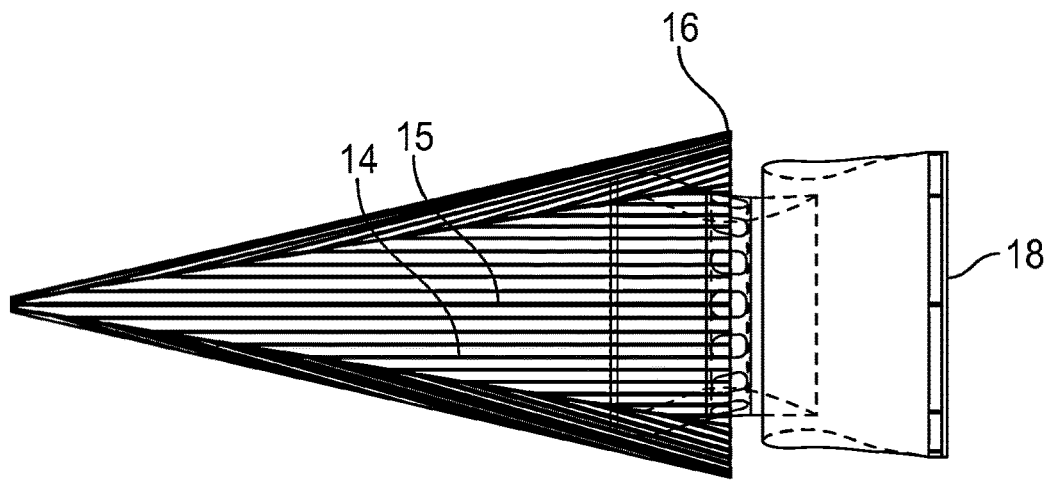
FIG. 17 is a cross-sectional view of the turbine of FIG. 16, with front and rear wildlife and debris excluders.
Figure 18:
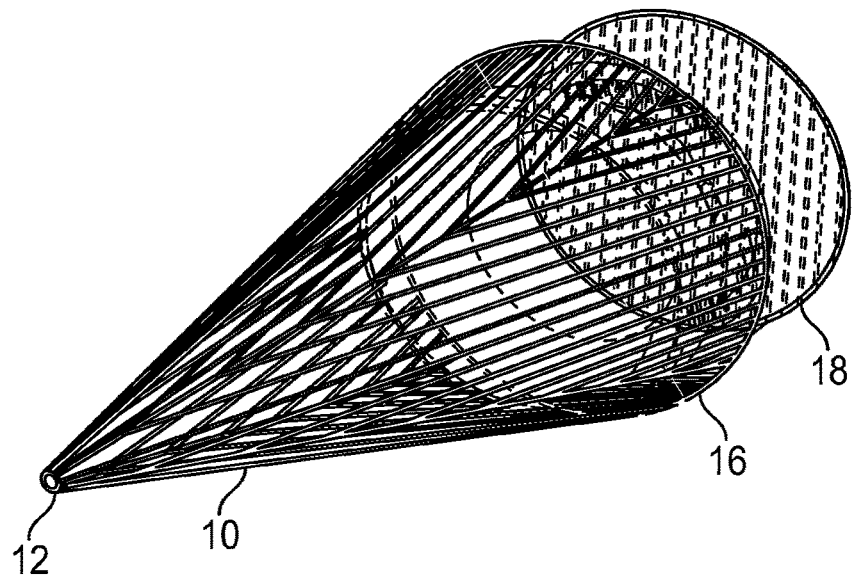
FIG. 18 is a perspective view of the turbine of FIG. 16, with front and rear wildlife and debris excluders and utilizing a hydrofoil/teardrop shaped deflector bar to form the excluders.
Figure 18A:
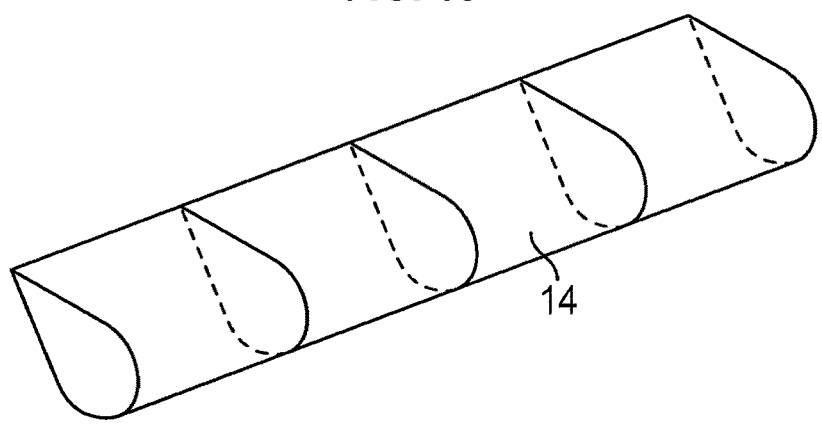
FIG. 18A is an isolated perspective view showing in detail the teardrop profile of FIG. 18.
Figure 19:
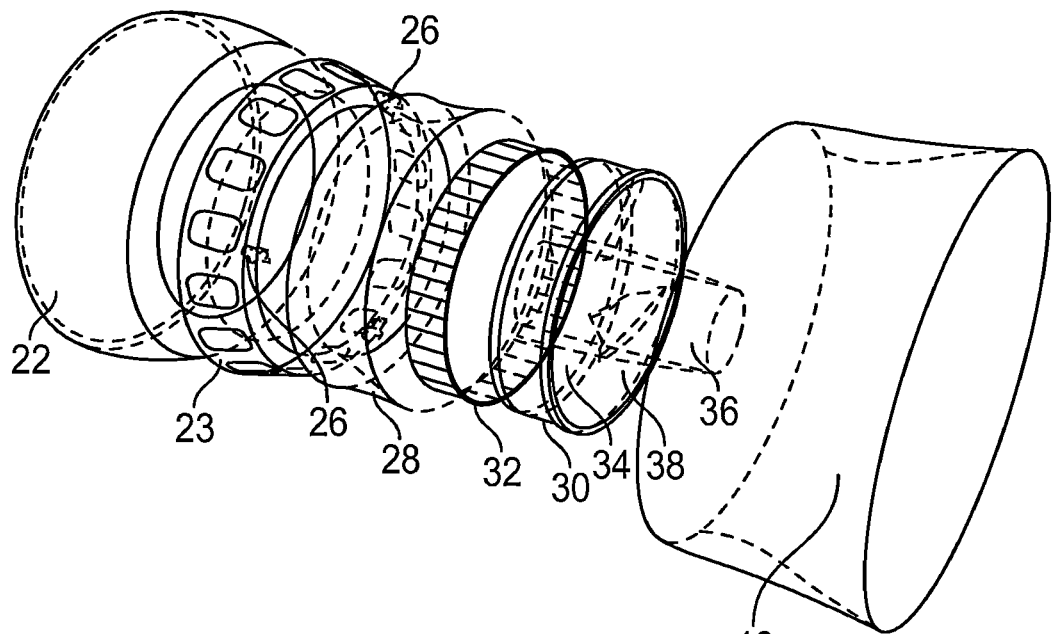
FIG. 19 is an exploded perspective view schematically showing all components in partial cross-section according to one embodiment of the invention.
Figure 20:
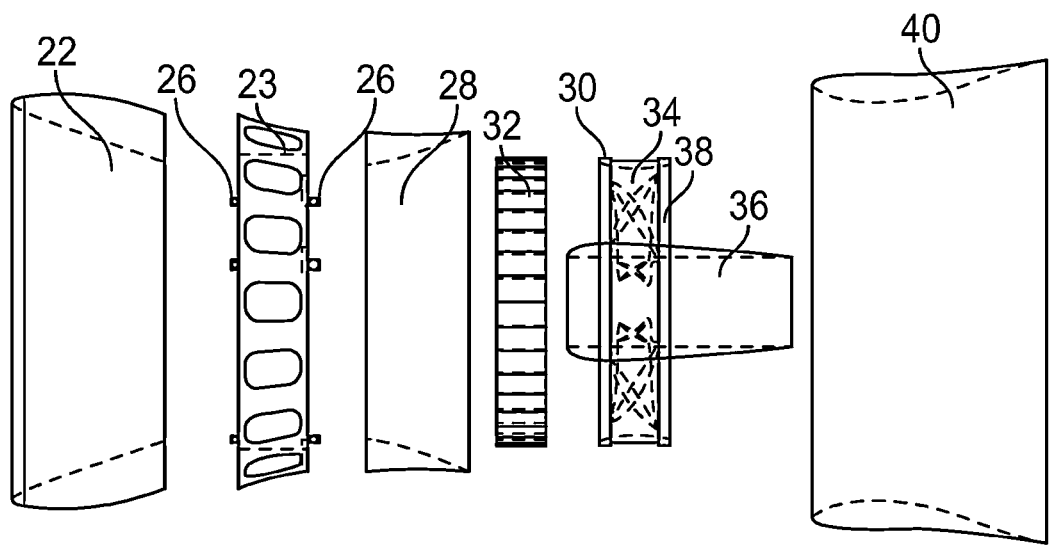
FIG. 20 is an exploded view of the turbine of FIG. 19, showing all components in a schematic side view and partially in section.

Referring now primarily to FIGS. 16-18, a hydrokinetic turbine that produces energy from a renewable source with zero carbon emissions should be environmentally friendly not only to the natural resources and to the atmosphere, but also to marine and wildlife. This invention deflects and keeps any marine life and floating or submerged debris above a specified size out of the hydrokinetic turbine's rotor of the invention. The size of marine life or debris that cannot enter the nozzle section of the turbine is specified by the spacing/distance (15) of the deflector rods (14) of the forward and rear excluder. In this invention the deflector rods, by design, run parallel to each other and are evenly spaced over their full-length to ensure that no distance between the rods (15) is greater in one place than in another. The distance of the spacing (15) is determined by the size and the species of marine wild life as well as the size of debris encountered to be excluded and to adapt to locational needs of specific sites of operation. It will prevent any sea life such as fish, turtles, sea mammals and even divers that are larger than the space (15) between the deflector rods (14) from entering into the rotor section of the hydrokinetic turbine from the front as well as from the back when a rear excluder is also employed.

The present designs contrast with other previously known designs, (see, e.g., (U.S. Pat. No. 3,986,787, US 2010/0007148 A1, and U.S. D 614,560) which are characterized by deflector rods that are non-parallel, such that the openings between the rods become bigger/wider towards one end of the excluder, thus not limiting the entry of marine life or debris to a finite size. Some other prior art devices are designed as concentric circular deflector rods (see, e.g., U.S. D 304,322 and U.S. Pat. No. 5,411,224) which define a finite size of opening, but such configurations do not effectively shed off all wildlife and debris like the deflector rods according to the present invention, which are aligned obliquely with respect to the flow direction. In the concentric design, wildlife or debris can easily become lodged between the rings. In the designs of the invention, the exact size of marine life or debris to be excluded can advantageously be selectively predetermined by the distance (15) chosen between the deflector rods (14).

Ocean currents and river currents contain floating debris of many sorts. This debris may be floating at the surface or submerged at different depths. Therefore, it is preferred to keep such debris out of the rotor section of the hydrokinetic turbine to the greatest extent possible, in order to prevent damage to the turbine and to ensure continuous and uninterrupted electrical output. The designs according to the invention effectively deflect and keep out any debris above the specified size (15) of the spacing of the deflector rods.

The hydrokinetic turbines according to the invention preferably have two wildlife and debris excluders, one (10) in front at the entrance (22) of the turbine and one (18) behind at the exit of the turbine. The front wildlife and debris excluder (10) is located in front of the turbine protecting the entrance (22) of the accelerator shroud (20), and is attached to the front end of the accelerator shroud as well as preferably to the support structure (50, 52) of the turbine. The deflector rods (14) of the excluder may be made of metal, fiberglass or synthetic materials with different diameters depending on the turbine size; from about ¼ inch on a small turbine and up to about 2 inches on very large units. The deflector rods are preferably hydrofoil/teardrop (14) shaped in cross-section (FIG. 18) with the blunt end pointing into the water flow and the sharp ends being the trailing edge. This configuration serves to avoid turbulence in the water flow that could disturb the efficiency of one or more other components, such as the accelerator shroud (20), the annular diffuser (40) and/or the rotor blades (34).

The first/forward wildlife and debris excluder (10) is preferably built so that the deflector rods on the forward end of the front excluder (14) form a generally cone-like shape. The deflector rods on the forward end are attached to a small ring (12) that preferably has the same inside diameter as the specified distance (15) between the insides of the deflector rods. On the back end, the deflector rods are preferably attached to a large ring (16) which is preferably greater diameter than the annular diffuser (40). The slope of the cone-like shape created by the difference between the forward ring (12) and the aft ring (16), to which the deflector rods (14) are attached, can be altered to adapt to different environmental needs. The front excluder is preferably positioned so as to slightly overlap the annular diffuser with a gap that is approximately the same size as the distance (15) between deflector rods, in order to maintain a finite size of wildlife and debris allowed to enter. It is designed to be cone-like shaped in order to shed off and divert any wildlife, debris, sea grass or whatever else may be floating in the stream of water about to enter the turbine.

The second/aft wildlife and debris excluder 18 (FIGS. 16 and 18) is located behind the turbine exit and is attached to the trailing edge of the (final) annular diffuser. The rear excluder is preferably also comprised of a grill or mesh of parallel rod members that are spaced apart from one another by the same pre-determined distance as the rods (14) in the front excluder, and in the case of the rear excluder, the most preferred configuration is a generally planar one. The rear excluder prevents larger sea life from entering into the rotor section from behind, even against the direction of the water current or also in the case of no current as for example during the change from an incoming to an outgoing tide. The deflector rods of the excluder are spaced to the same specified distance (15) as the forward wildlife and debris excluder to prevent any wildlife or debris larger than the specified distance from entering into the rotor section. All the deflector rods (14) of both of the excluders preferably have a hydrofoil shaped cross-section, to minimize the creation of turbulence and vortices that would negatively affect hydrofoil shapes that may be present on one or more of the other components, such as, the rotor blades, the accelerator shroud, the annular diffusers, and/or the center hub.

The smaller sea life that can pass through the spacing (15) of the deflector rods is advantageously provided a secondary path for safe passage through the cylindrical center hub (36) having an open center (37) in the majority of the depicted turbine embodiments. The open center of the rotor section is described above. Because the water flow speed in the center hub is faster than outside where the blades are situated, smaller sea life will be aspirated through that opening and can exit unharmed. The diameter of the open center may vary widely, without materially affecting the performance of the turbine. The optimum diameter can be calculated for each application, and in certain preferred embodiments is typically approximately ⅓ of the overall diameter of the rotor section. The accelerated flow of the water through the open center (37) serves to safely convey small wildlife and small debris through the inside of the turbine.

No matter which installation method is chosen, the turbines according to the invention are preferably automatically self-orienting, meaning that they will always point exactly into the direction from which the water flow is coming. This is preferably achieved by the installation behind the turbine of a fixed tail rudder (60), which is preferably hydrofoil shaped and will orient the unit directly into the direction of the stream of water flow. This feature allows the device to point exactly into the direction from which the current is coming, so that the water passing over the hydrofoil shaped components of the turbine flows at the optimal angle over all hydrofoil shaped surfaces. This optimizes the pressure differential between the two sides, increases the synergistic effect of the hydrofoil shapes and helps to assure a laminar flow of the water.

The design of the hydrokinetic turbines of the invention is such that the flow of the water is always from the same side, i.e., unidirectional. This allows the turbines to take great advantage of many asymmetrical hydrofoil shapes and hydrodynamic effects, which, when combined together, result in a much more efficient turbine. Bi-directional turbines cannot use asymmetrical hydrofoil shapes, and are therefore less efficient.

The turbines according to the invention do not only utilize the Venturi/Bernoulli effect much better due to their unidirectional flow, but they also increase the flow velocity further with the use of the preferred asymmetrical hydrofoil shaped accelerator shroud and/or annular diffuser, and/or the preferably hydrofoil shaped center hub.

The annular generator design preferably has magnets (32) mounted on the rotor blade shroud (38) and copper or other metallic coils (25) in the stator housing (24) which is preferably located inside the accelerator shroud (20). This design eliminates the need for a gearbox or transmission or hydraulic systems to mechanically extract and convey the energy out of the turbine. Gearboxes, transmissions and hydraulic systems create friction that consumes a portion of the energy that the turbine produces. By the usage of an annular generator, the invention minimizes these friction/transmission losses and creates a more efficient turbine or generator. The electrical energy generated directly inside the turbine is transmitted through electrical wires (not shown) eliminating friction/transmission and power losses. The energy produced is then transmitted for conditioning to an inverter/transformer that typically is located outside the turbine, wherever deemed practical. The preferred design according to the present invention also eliminates the need to have center bearings, which thereby eliminates the need for any fixed structure whatsoever (e.g., shaft or hub) located within the flow area through the turbine. The absence of any fixed structure furthermore means that no struts or other elements are needed to support that fixed structure.

The accelerator shroud (20), the annular diffuser (40), the hydrofoil shaped center hub (36, 80) and the rotor blades (34) of this turbine are preferably constructed of composite building materials, such as, e.g., carbon fiber, aramid fiber, fiberglass or similar in either solid fiber and resin or over structural foam core material or honeycomb core material. Some parts such as the stator housing are preferably hollow to accommodate the copper coils (25) of the stator. Other parts such as the entrance duct (22), the aft fairing (28) of the accelerator shroud (20) and the annular diffuser (40) may in some preferred embodiments be solid or sandwich construction and remain hollow on the inside, with the option to be selectively filled with water when submerged. With the appropriate (for the water depth) structural bracing on the inside of the hollow parts, they will be able to withstand the water pressure of being submerged. In the case of sandwich construction, these composite materials utilized are naturally buoyant and will keep the turbine floating. Although composite materials are ideally suited for the construction of this hydrokinetic turbine, the device may also be built of steel, aluminum, titanium or other metal alloys deemed suitable for a specific application. The overall buoyancy of this turbine will mostly be positive and may use ballast to keep it submerged. The turbine may also be submerged by allowing hollow compartments to be filled with water. The installation of an appropriate amount of ballast or water filling of certain compartments will allow the overall buoyancy of the turbine to be controlled to selectively make the turbine become either positively buoyant, neutrally buoyant or negatively buoyant, for different applications.

The preferred self-orienting feature of the device allows this turbine to be a unidirectional flow turbine. In a unidirectional turbine, the existence of a water flow that is always coming from the front of the turbine allows the use of asymmetrical or unidirectional hydrofoil shapes in the design. Accordingly, any or all of the basic components, i.e., the rotor blades, the accelerator shroud, the annular diffusers, the hollow center hub, the tail rudder and/or the wildlife and debris excluders can advantageously comprise, to at least some degree, asymmetrical hydrofoil shapes. The asymmetrical or unidirectional hydrofoil shapes are much more efficient than symmetrical and bi-directional hydrofoils.

The relationship and cooperation between those elements that may include the asymmetric hydrofoil shapes, i.e., the accelerator shroud, the rotor blades, the annular diffuser, the hollow center hub and/or the wildlife and debris excluders produce a mutually beneficial and synergistic effect, which is enhanced as more of these elements are provided with the asymmetric hydrofoil profiles. In the most preferred embodiments, all five of these elements benefit from each other's presence, and when combined together, their effect is amplified to create a much greater negative pressure field behind the turbine than they would create individually or separately. In other words the effect of the plurality of elements together is greater than the sum of the plural elements individually. This synergistic effect creates a greater acceleration of the flow through the rotor section where the asymmetrical hydrofoil shaped blades take greater advantage and are able to rotate at higher speed or RPM. These combined effects result in a synergistic effect that is mutually beneficial and that results in much higher efficiency that allows greater energy extraction thanks to this "Flow Acceleration Technology" developed by the inventor.

Figure 36:
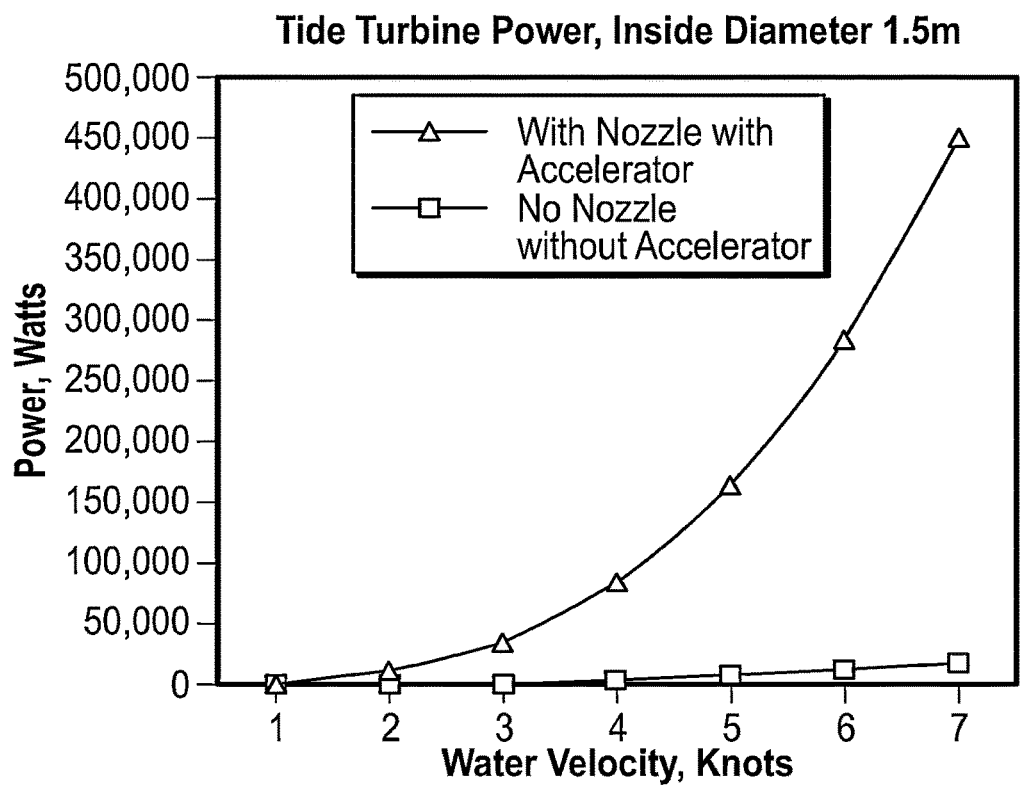
FIG. 36 is a graph comparing power output from hydro-turbines according to the invention in comparison to similar machines not having hydrofoil shrouds, at varying water velocity.

With reference to FIG. 36, the table shows how, for one preferred embodiment, the presence of the hydrofoil shaped accelerator shroud results in an exponential acceleration of the flow velocity through the nozzle section, compared to the ambient flow speed.

The data represented in FIG. 36 illustrates the difference in power output with increased ambient current velocity for between 2 different designs of hydrokinetic turbines with a 1.5 meter diameter rotor. The line with squares represents a hydrokinetic turbine that simply has a hub and 3 blades, with no shroud that all (which is the most common use designs used in hydrokinetic turbines worldwide). The line with triangles demonstrates the output of this invention that utilizes hydrofoil shaped accelerator shroud, annular diffuser and open center hub. This is the same relationship for the same rotor assembly contained within an accelerator shroud having a hydrofoil shape similar to that depicted in FIG. 35. It is seen that the increase in power is according to an exponential power on the order of 3. It can also be seen that, in the lower range of current velocities, (e.g., around 3 kn which represents the vast majority of applications for hydroturbines of this type), the comparative relationship is less sensitive to changes in current speed. Therefore, in this common range of operation, it is especially important to optimize the design of the shroud member (and other components and relationships), in order to maximize the relative increase in power output.

Another way to demonstrate the increased efficiency of the turbines of this invention is in a comparison to other highly efficient commercially available turbines. One of the most successful hydrokinetic turbine manufacturers and installers in the world has recently developed a new design of hydrokinetic turbine which it claims is their most efficient. It is a bidirectional turbine that has a 16 m diameter rotor section with an exterior shroud and a open center hub which is claimed to be able to produce 2.2 MW. Utilizing the design methodology of the present invention, a turbine having the same 16 m diameter rotor section will produce 3.88 MW, according to our "theoretical calculations". This represents a 76% increase in electrical output for the same size turbine.

Below is a calculation used for output prediction for the hydrokinetic turbine designs according to the invention:

| Theoretical Calculations of turbine output in relation to water flow speed | | |
|---|---|---|
| Incoming Flow Velocity | 3 | Knots |
| Turbine Inside Diameter | 16.000 | Meters |
| Predicted Turbine Power | 3,882,476 W | 3.88 MW |
| Nozzle diameter ratio | 1.473 :1 | |
| Nozzle influence, Velocity | 2.948 :1 | |
| Flow tube available | 23.573 M | |
| Flow Velocity in Nozzle | 8.844 Knots | 4.549746 M/S |
| Turbine Area | 201.062 M^2 | |
| Power Coefficient and Betz Law | | |
| Density = | 1025.15 Kg/M^3 | |
| Velocity = | 4.550 M/S | |
| Diameter = | 16.000 M | |

| Theoretical Calculations of turbine output in relation to water flow speed | |
|---|---|
| Max Possible % (Betz) | 0.59 Cp |
| Betz Limit power P = | 5,751,816 W |
| Predicted Turbine Cp | 0.4 Cp |

Figure 22:
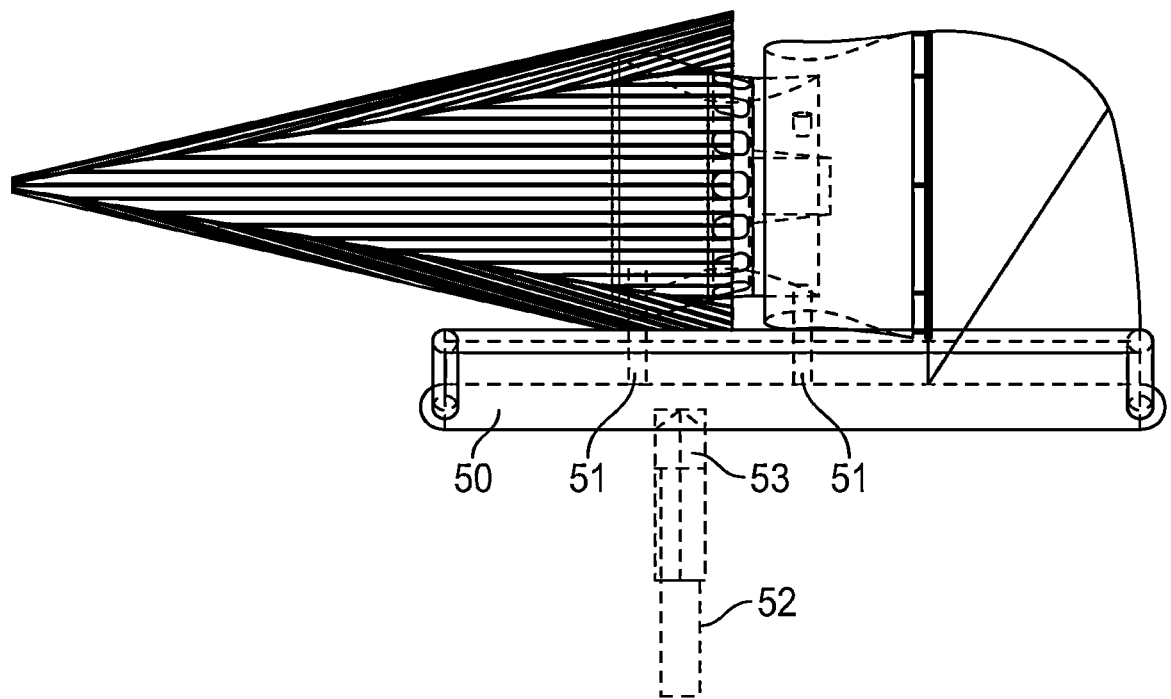
FIG. 22 is a cross-sectional side view of the piling mounted hydrokinetic turbine of FIG. 21, installed on a pivoting pedestal.

Installation Methods:

The hydrokinetic turbines according to the invention can be installed in practically any moving body of water or can be moved through the water to create usable output. There are five primary ways of installation and deployment methods for these hydrokinetic turbines:

Piling-mounted (FIGS. 21, 22): The turbine unit or units can be a piling mounted installation, which consists of a piling (52) driven into the ocean floor or riverbed that has a set of rotational thrust bearings and a compression pivoting bearing on the top (53). A larger pipe that that is attached to the mounting structure (50) on which the turbine sits sleeves over that fixed piling (52) and the bearings (53). The mounting structure (50) can unbolt from the pipe (52) and has an electrical plug (53) inside the pipe that can be unplugged for maintenance and turbine removal. This installation allows the turbine unit to pivot and the turbine can freely rotate 360° to orient itself exactly into the direction of the water current. This type of installation also has a very small seafloor footprint and minimal impact on the environment. In this installation the electrical power is transmitted through a set of copper rings and charcoal brushes (53) inside the sleeve to avoid a cable being twisted and any restraint on the pivoting action.

Figure 23:
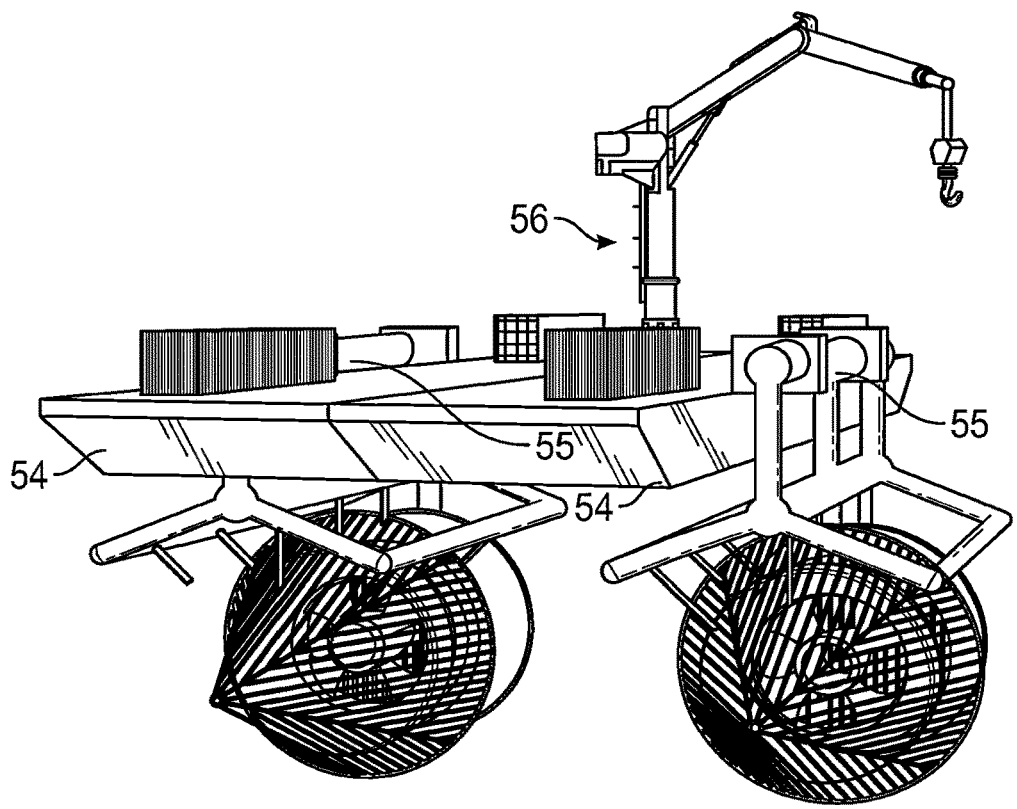
FIG. 23 is a schematic perspective view of raft-mounted hydrokinetic turbine installed on an ocean barge, with both turbines operating.
Figure 25:
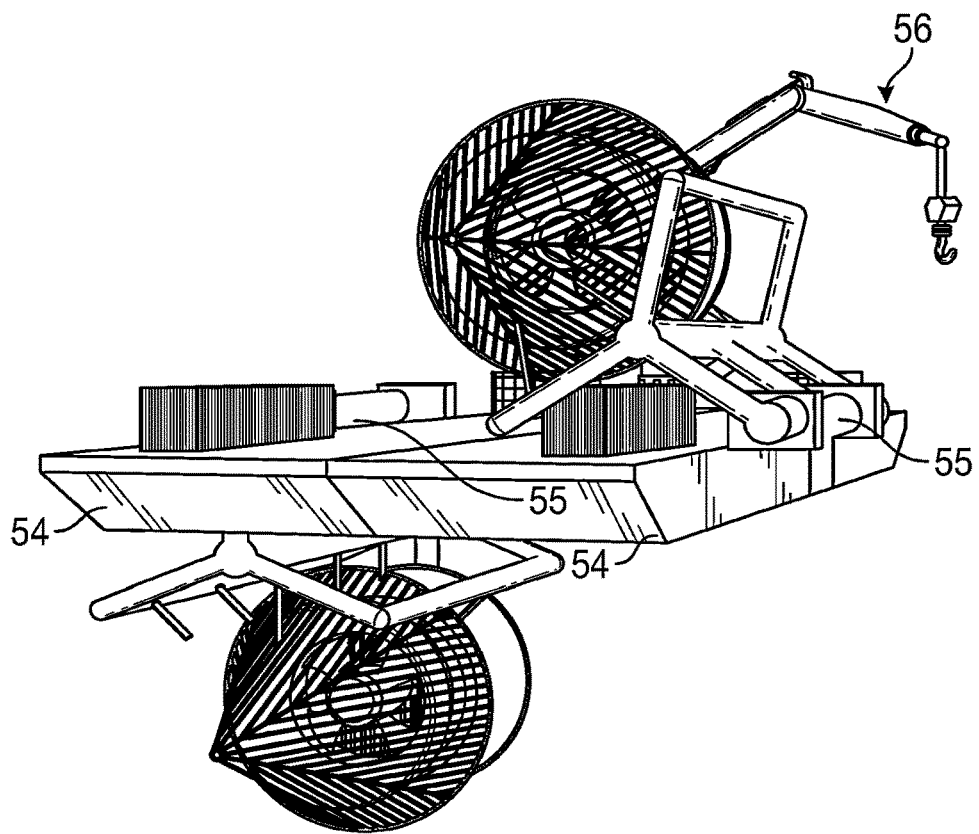
FIG. 25 is a perspective view of the raft-mounted hydrokinetic turbine installed on ocean barge, with starboard side turbine operating, and with port side turbine in maintenance position.
Figure 26:
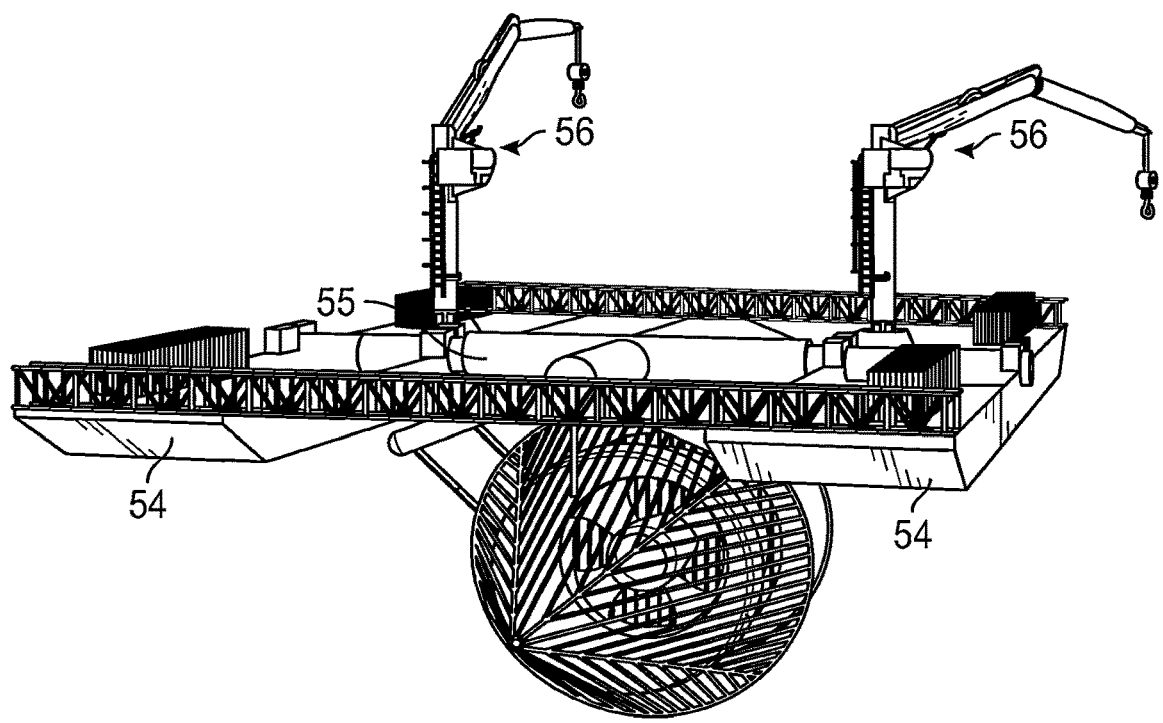
FIG. 26 is a perspective view of the raft-mounted single hydrokinetic turbine installed between two ocean barges.
Figure 27:
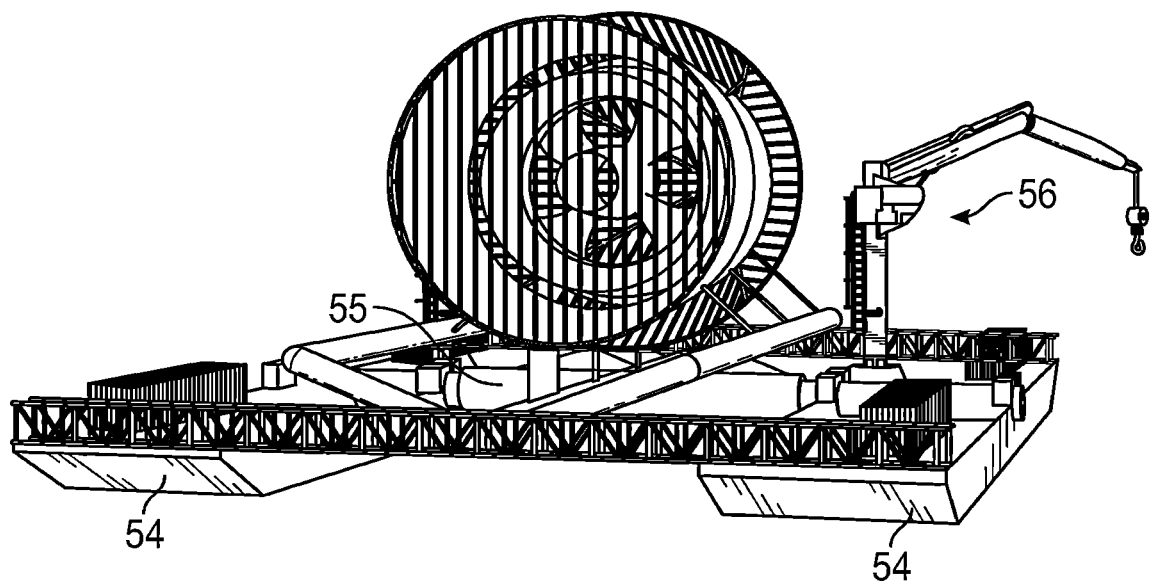
FIG. 27 is a perspective view of the buoyant in installation of a hydrokinetic turbine installed on a submersible raft.

Floating structure-mounted (FIGS. 23, 24, 25, 26, 27): The turbine unit or units can be attached to any kind of floating structure such as an ocean barge, a raft (54), a ship or a vessel floating on the surface of the water. These devices can either be anchored to the seabed or riverbed (59) or held in place by thrusters coupled to GPS location devices similar to oil rigs or tied to any structure in the ocean or in a river or along shore. There are two types of raft mounted installations, one is on a longitudinal pivot (FIG. 23, 24, 25) and the other is on the transverse pivot (FIG. 26, 27). Preferably, the raft mounted device either employs a hoisting system or a crane that is installed on deck or a helical gear driven device to pivot the turbine onto the deck. One type of installation utilizes only one raft or barge, whereas the transversely mounted system employs two rafts or barges, with the turbine unit mounted in between them. Depending on the size of the turbine, the location or the operator's preference, one type of installation can be better than the other. For larger systems it is usually advantageous to use two rafts or platforms and mount the turbine between the two on the central transverse axis (FIG. 26, 27), on which the turbine can be pivoted 180° to be above the water for maintenance or repair. For smaller units the turbine or turbines can be mounted over the side of the floating structure and be pivoted on the longitudinal axis (FIG. 23, 24, 25), to be placed on the deck of the structure for maintenance or repair.

Figure 28:
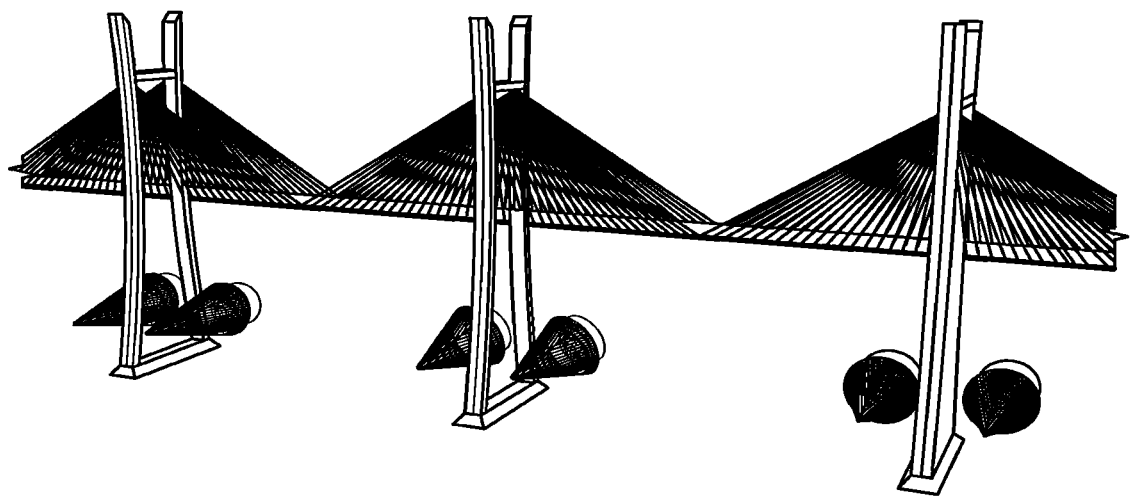
FIG. 28 is a schematic perspective view of a structure-mounted hydrokinetic turbine installed on a bridge across a river.

Land-based structure-mounted (FIG. 28): The turbine unit or turbine units can also be mounted to a land-based structure such as a seawall, a shoreline or be attached to a bridge pillar or other structures installed in the stream of an ocean current or in a river current. The device can preferably be mounted on any of these fixed structures by at least two different methods. Support structure to which the turbine is attached can be mounted either to one or two rails attached to the fixed structure on which the unit is lowered into the water and raised up out of the water for maintenance or repair, or it can be mounted on a pivot which also allows the device to be pivoted into the stream of water and back out of the water for maintenance or repair. Either way, the units are held in place in the up position by a latching mechanism, whereas in the down position it can rest on some end stops. The cable connection preferably goes to the base structure and from there to a transformer for conditioning.

Figure 29A:
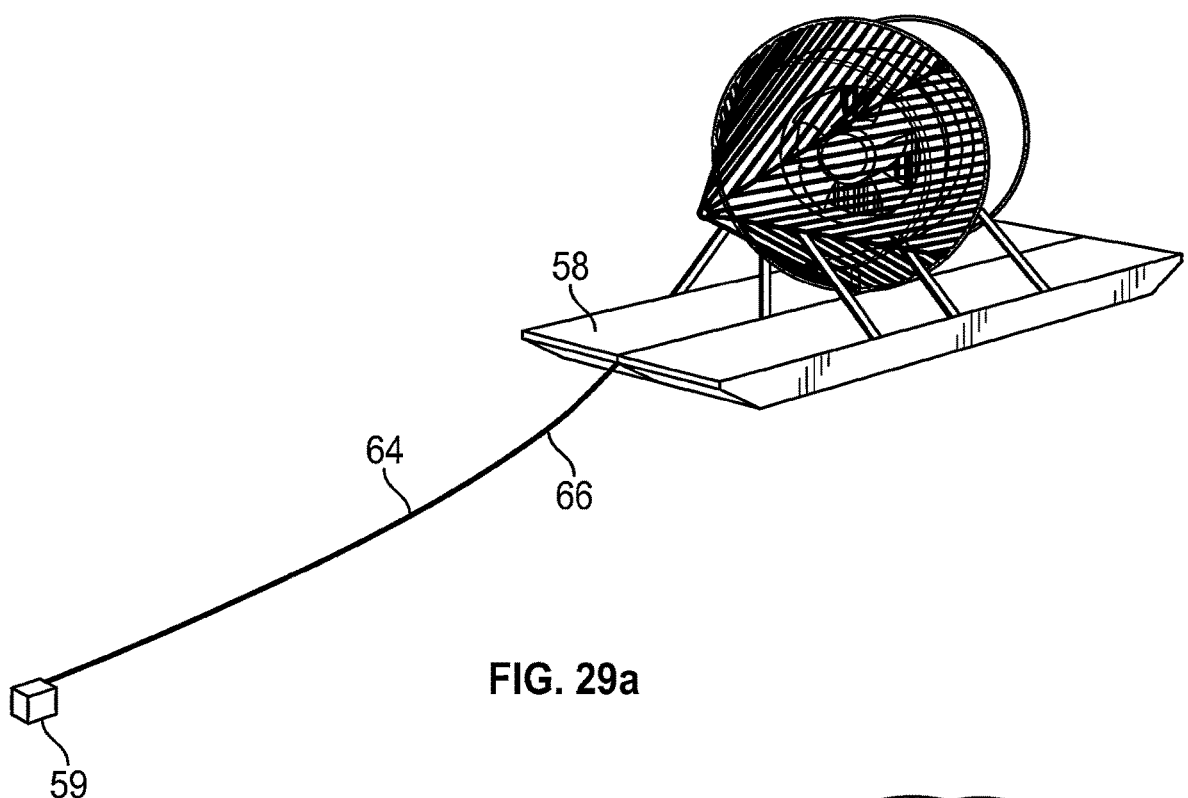
FIG. 29A is a schematic perspective view of a buoyant installation of a hydrokinetic turbine mounted on a submersible raft installed on an ocean bed or river bed.
Figure 29B:
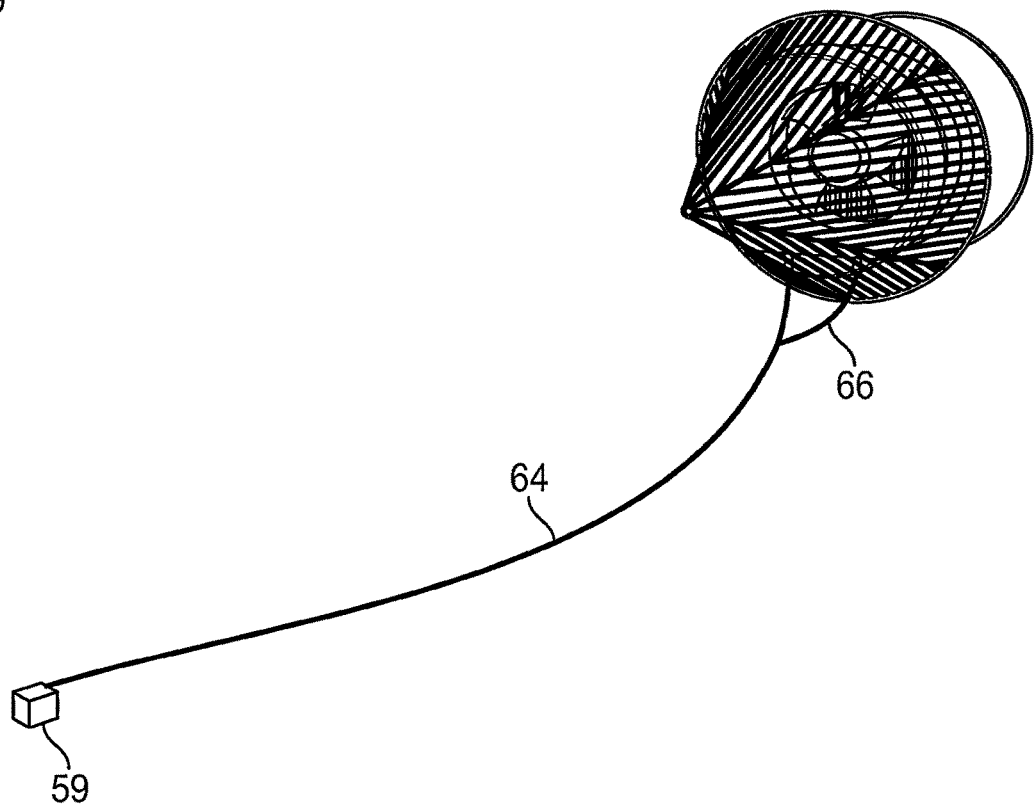
FIG. 29B is a schematic perspective view of a buoyant installation of a buoyant hydrokinetic attached directly to the tethers installed on an ocean bed or river bed.

Buoyant installation (FIG. 29): The turbine unit or turbine units can be made naturally buoyant due to the composite construction materials that can be employed for the construction of any or all the parts. This allows the device to float at any given depth determined by the length of a tether (64 & 66) which is attached to a foundation/seabed mooring (59) or screw-type anchor, or any other fixed device on the seabed or the riverbed. The two-part tether serves two purposes: the fixed tether (64) and the rolling tether (66) is to hold the device submersed at the desired depth and to transmit electricity from the generator unit to the base and then to shore. This tether (64 & 66) has 2 components; a primary fixed tether (64) that is a fixed length between the turbine and the secondary rolling tether (66) which is a rolling mechanism that is attached to the base and is the equal in length to the distance between the water surface and the desired depth where the turbine is to be held. When the secondary tether is unrolled the turbine is allowed to float to the surface for maintenance or repair. The device may also be attached on a submersible raft (58) or submerged flotation device (58), to hold the turbine suspended in midstream. The same tether mechanism can be utilized in this case.

Figure 30:
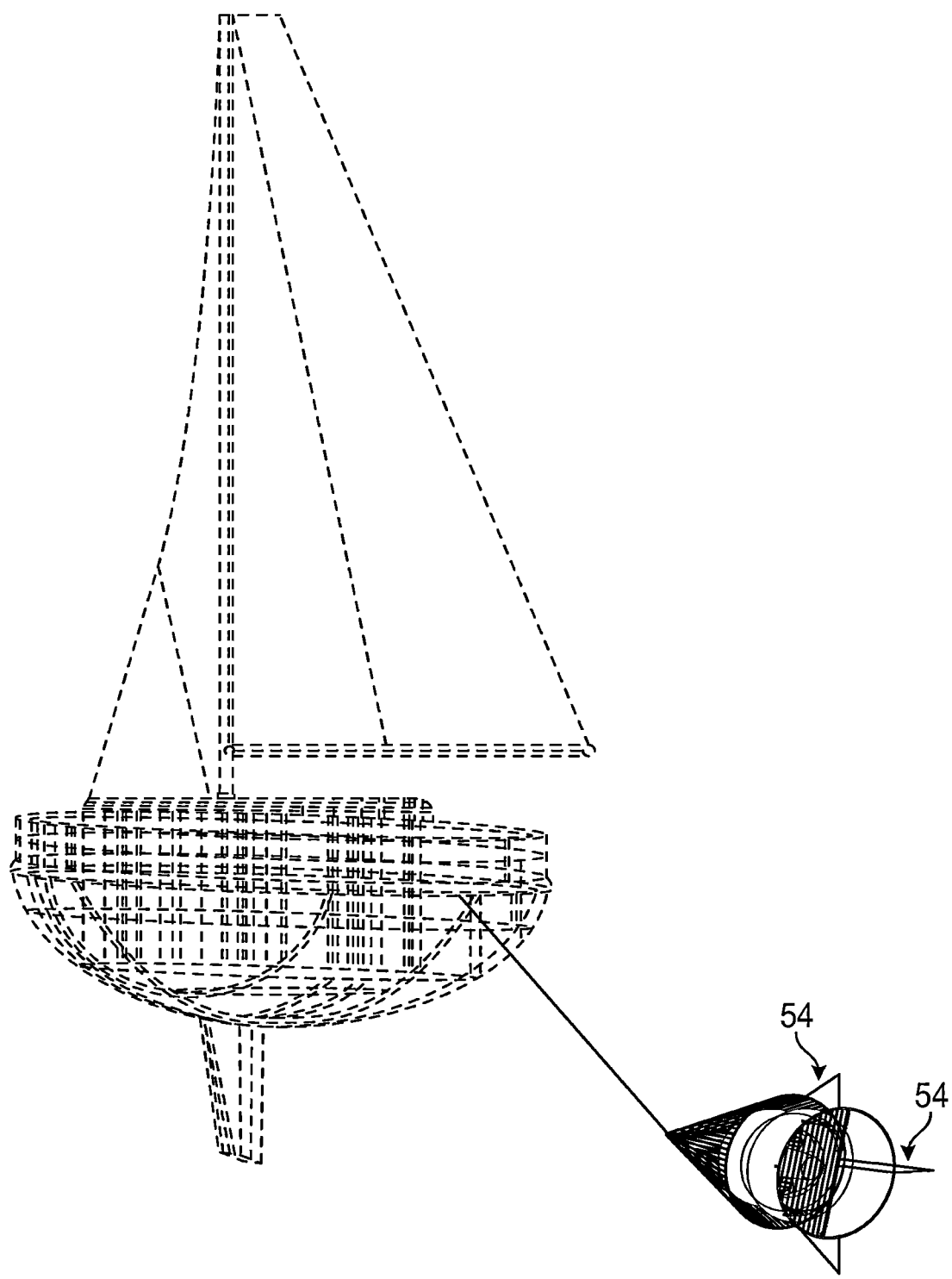
FIG. 30 is a perspective view of one embodiment of a towed installation of a hydrokinetic turbine being towed behind a vessel.

Towed installation (FIG. 30): The turbine unit or turbine units can also be towed behind a vessel or be dragged through the water by other devices that propel the device through water that is not moving, to artificially create a water flow through the device. The towing cable is typically attached to the front of the wildlife and debris excluder, and therefore would orient the turbine to optimally create the flow from front to back through the unit. Instead of the single rudder that is usually located behind the exit of the turbine, there can alternatively be 2 or 4 winglets (62) attached to the outside of the annular diffuser; with one winglet on each side and one winglet on top and bottom. These winglets (62) prevent the turbine unit itself from rotating as it is towed through the water, thereby ensuring that only the rotor section is rotating.

Maintenance Procedures:

The hydrokinetic turbines of the invention require only minimal maintenance, due to the design of the components and because the preferred composite construction materials are virtually corrosion free. However just like everything that is submersed in the ocean over a certain length of time fouling and marine growth will occur. These hydrokinetic turbines are coated with non-toxic antifouling paints, but still need periodic cleaning of the surfaces to ensure optimal functionality and output. These units can be pressure washed by a diver while they are submerged which allows them to remain underwater or they can be brought to the surface and be pressure washed by ground personnel. Other than periodic cleaning, these units require very little maintenance. Depending on the type of installation, the preferred maintenance procedures may vary, as discussed below.

In the case of a piling-mounted installation (FIG. 21, FIG. 22), it is preferred to utilize a special maintenance vessel (also designed by the Applicant) that is a catamaran vessel having a removable deck between the two hulls, and a gantry with a hoist installed over that removable deck. The vessel can be positioned above the turbine that needs maintenance, and the turbine unit can be lifted by reaching through the opening in the deck between the two hulls and hoisting the turbine onto the boat. The electrical wire connecting the turbine to shore leads to copper rings and brushes (53) that are located inside support piling for pivoting (52) has a waterproof plug (53) that can be unplugged when the turbine is lifted up by the maintenance vessel located above. On the vessel, the turbine that was just removed from the piling can be put off to one side, onto one of the hulls, and a spare turbine sitting ready on the other hull can be lowered through the opening and plugged and bolted back onto the piling, from which the first unit was removed.

In the case of a raft-mounted installation, it is preferred to attach the support structure (50) of the turbine either longitudinally alongside the raft or transversely between two rafts (FIG. 23, 24, 25, 26, 27) In each case, a support structure (55) is used that is mounted on pivot points with bearings (55), which allow the unit to pivot around a central axis either 270° in the case of longitudinally mounted units (FIG. 23, 24, 25), or 180° in the case of transversely mounted units (FIG. 26, 27). A locking mechanism is used to hold the units in place when submerged for power generating, as well as when surfaced for maintenance or repair. To surface the unit, a crane or hoist (56) installed on the raft is employed that can attach to the support structure of the turbine. Once unlatched in the submerged position, the crane can pull the unit out of the water by pivoting the unit into the maintenance position where it can be secured by latching into position.

In the case of a fixed structure mounted installation (FIG. 28), the turbine units can be maintained or repaired by at least two methods. One method is to have a floating platform or raft that is put in place after the turbine is hoisted out of the water, either by sliding the turbine mounted to the support structure upwardly on the rails of the fixed structure, or to make the units mounted on the support structure upwardly out of the water. The other procedure is to have a platform that is attached to the fixed structure that can swing out of the way for raising the turbine units out of the water and then be repositioned for servicing.

In the case of buoyant installation, there are also at least two ways of servicing the turbine units. In the case of a buoyant turbine that is tethered to the seabed or the riverbed by a fixed tether (64) that is attached to the rolling tether (66) is lengthened by unrolling the pulling mechanism (described in the installation description above) and bringing the turbine to the surface. Once at the surface, the turbine unit can be hoisted onto the deck of a vessel for maintenance or repair. In the case where the turbine units are attached to a submerged raft (58) or flotation device, the rolling tether (66) pulling mechanism unrolled in the same manner as with a buoyant turbine, and once at the surface the turbine units can be pivoted up onto the platform for servicing.

In the case of a towed installation, the towing line attached to the turbine unit is hauled in to bring the turbine unit alongside or behind the vessel, where it is typically picked up by a hoist or a crane mounted on the vessel. The turbine is then preferably placed on the deck of the vessel for maintenance or repair.

Methodology of Design

The way in which the turbine units of this invention have been designed is believed to be novel and unique. After over 30 years of experience as a designer working in the field of fluid dynamics, and after having created and built many different types of hydrofoils in his professional life, the Applicant came to the basic concepts underlying the design of the turbines according to the invention. With these basic design concepts, he believes that his turbine designs according to this invention provide hydrokinetic turbines that will surpass and outperform any other design that is currently in existence.

Today there are many environments in which hydrokinetic turbines are used that are characterized by a reversing current flow, and as a result much of the modern design work has focused on providing bi-directional turbines that can effectively be employed in such environments, mainly tidal currents. Consequently, many of these bi-directional turbines either embody little or no hydrofoil-embodying components, or if they do, the hydrofoil designs are necessarily symmetric. However, the cross-section lift coefficient of an asymmetric or cambered hydrofoil is greater than that of a symmetric hydrofoil. This design of the unidirectional hydrokinetic turbines according to the present invention takes advantage of that phenomenon.

It was determined that it made the most sense to primarily optimize hydrokinetic turbines according to the invention for a 3 kn current (e.g., see the embodiment depicted in FIGS. 34 and 35) because currents around 3 knots are the most commonly occurring currents in ocean currents, as well as in tidal currents and also in many river currents. There are also examples of locations and/or circumstances in which higher current speeds between about 5 kn and 7 kn are commonly found, e.g., in areas where special geographic features are present such as, for example, rapid flowing tidal currents or river currents, or even ocean currents in rare instances, and then also in the case of towing one of the hydroturbines behind a watercraft, typically a sailboat. In order take into account these higher current speed situations, the application also describes design modifications intended for embodiments designed for a 6 kn current, as being representative of and also exemplifying turbines intended for use in environments exhibiting these higher current flow velocities. Therefore, the application describes embodiments that are representative of designs for use at these two most (i.e., nearly all) commonly encountered flow speeds. Of course, following the teachings of this application, the turbines according to the invention can be optimized for any flow speed, which from a practical standpoint includes currents ranging from about ½ kn to up to about 12 kn of flow speed.

There are many standard algorithms used in fluid dynamics to calculate the shape of hydrofoils, and the standard textbooks and databases contain complete information and tables pertaining to such calculations and known designs. These need not be discussed in the present context, since they are well known to those skilled in the art. However, as is discussed below, in some embodiments, the present invention utilizes these algorithms/databases in a novel design regimen, as a starting point to design novel hydrofoil shapes that serve as the so-called "initial" designs in the first stages of the hydroturbine design process.

According to one mode, the design process typically starts out with hand-drawn sketches (usually but not necessarily novel) based upon conventional fluid dynamic considerations, which sketches are selected based upon the novel principles according to this invention. The selected sketches are subsequently entered into a computer program of the type called a 3-D modeling program, one example of which is called "Rhino 3-D" or "SolidWorks". This results in a first version of the "initial" designs.

Alternatively, the first version of the "initial" design can be produced by selecting various different hydrofoil shapes from one of the databases, such as the archives of the National Advisory Committee for Aeronautics (NACA), again based upon the same conventional fluid dynamic considerations that are employed in fashioning the hand-drawn sketches, but again the shapes are selected (from among a huge number) based upon novel design considerations taught in this application. The shapes of these first version, "initial" intuitive hydrofoil shapes (irrespective of how arrived at) are modified with the 3-D modeling software, such as Rhino 3D or SolidWorks and analyzed in a 2-D flow analysis program, such as "Java Foil" or the like, and other similarly commercially available software products for this purpose. This modification proceeds by viewing the selected "initial" profiles in 3-D and making modifications thought to be favorable based upon fluid dynamic considerations, so as to maintain laminar flow and avoid turbulence, while maintain maximum flow speed. As a result of this first stage, modified "initial" designs are created that represent new (novel) and unique shapes of hydrofoils according to the principles of the invention, which are then made into an annular or a nozzle shape, for the purpose of employing them in the context of a hydroturbine.

Figure 33A:
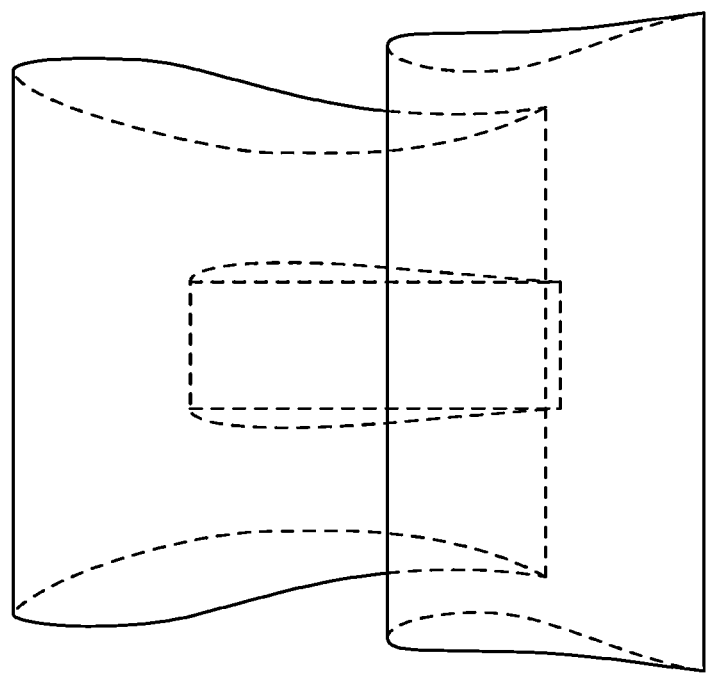
FIGS. 33A and 33B are, respectively, a schematic side view of an accelerator shroud, diffuser and center hub initially selected for a 6 kn current, and a corresponding view of an accelerator shroud, diffuser and center hub that have been optimized for a 3 kn current.
Figure 33B:
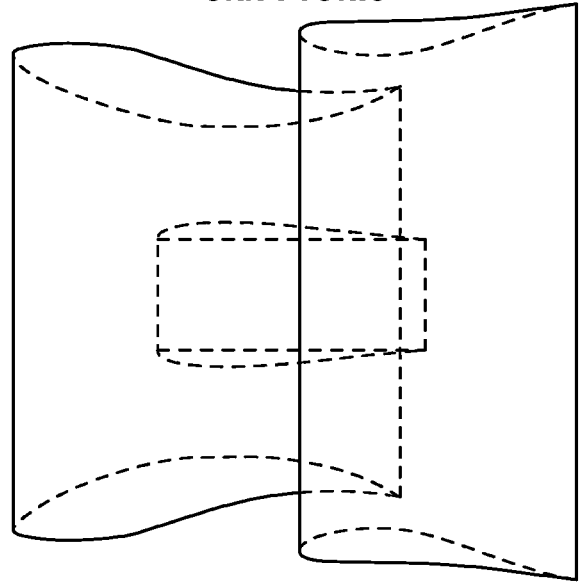

Generally, when considering design for a single selected current speed, such as, for example, 3 knots, the size of hydroturbines according to the invention can be scaled up or down with typically only minor changes in the overall configuration. The main influencing factor of the choice of an "initial" hydrofoil shape, and then the further modification of that profile, is the flow speed of the water current in which the turbine is to be placed. In higher flow speeds such as 6 kn, for example, the cross-section of the hydrofoil shapes are generally more slender and flatter (less camber on both sides of the hydrofoil) then they are in a profile design for a 3 kn current, where the cross-section of the hydrofoil would be more curved and thicker (more camber on both sides of the hydrofoil). This is generally illustrated in FIG. 33, where the differences in the respective cross-sections or profiles are clearly visible. In higher flow speeds, the cord of the hydrofoil shape is also often increased. This is also visible in FIG. 33, where in FIG. 33a the modified "initial" designs for the center hub and the accelerator shroud are more elongated when designed for use in a 6 kn current, than in the case of a similar configuration designed for use in a 3 kn current, as shown in FIG. 33b (which, however, is not an "initial" design, but rather a final design resulting from the second stage of the design process, as described below). These modifications (carried out in the 3-D modeling software) are always done to create optimal lift and maximum flow speed acceleration. With the modified "initial" design of FIG. 33a, which is somewhat intuitively designed in the first step of the process, as discuss above, it is now possible to move to the second stage of the design process (discussed below) in which the modified "initial" design is subjected to the more quantitative optimization using CFD analysis.

The rotor blade shape is designed in the same fashion as the center hub and accelerator shroud. Thus, a suitable "initial" hydrofoil shape is sketched or chosen from the library, for the cross-section of the rotor blade, in accordance with the principles of the invention, and then modified (utilizing fluid dynamics principles) based upon the speed with which it travels through the water, which speed is greater at the tip of the blade than at the root of the blade. Accordingly, the hydrofoil cross-section of the rotor blade, the length of cord, the thickness of the cord/profile and the incidence of the cross-section each preferably changes, more preferably changes continuously, from the root of the blade out to the tip of the blade. During the first stage of the design process, as many modifications as possible are made by intuitively applying fluid dynamic considerations, to arrive at a modified "initial" design. As is understood by persons skilled in the art, this is typically done with the aid of software products designed to assist such design activities, such as, for example, programs called "JavaProp," "QBlade," and the like. (The variations described here can generally be visualized by looking at the preferred final or "optimized" embodiment illustrated in FIG. 34, which depicts a rotor blade profile that is "optimized" (in the second stage) for a 1.5 m diameter of the rotor blade section, for use in a 3 kn current. It is clearly visible how all the parameters defining the hydrofoil shape of the blade and its incidents change between the root and tip of the blade.)

With reference to FIGS. 37A and 37B of the drawings, the former shows the flow acceleration in 2-D velocity resulting from software analysis, whereas the latter is a related presentation showing flow acceleration in 2-D pressure. Both figures clearly show areas of enhanced acceleration resulting from the design characteristics according to the invention.

Turning now to the second stage of the development process, those modified "initial" shapes created in the first stage of design are then analyzed for their efficiency working together in a turbine environment in creating the greatest pressure differentials and with the least turbulence to achieve maximum water flow acceleration through a nozzle. This is the "optimization" step, in which final, optimized shapes are determined for each of the hydrofoil components. For this analysis there is utilized what is called Computational Fluid Dynamics (CFD). As is well known, this testing is always done in a 3-Dimensional framework. These simulations can be done in any known CFD computer program, such as one called "STAR CCM+" which is one of the most advanced softwares in this field. This software enables the designer of an intuitively created hydrofoil shape to analyze and optimize flow characteristics in a virtual environment prior to building prototypes for real life testing.

Figure 38A:
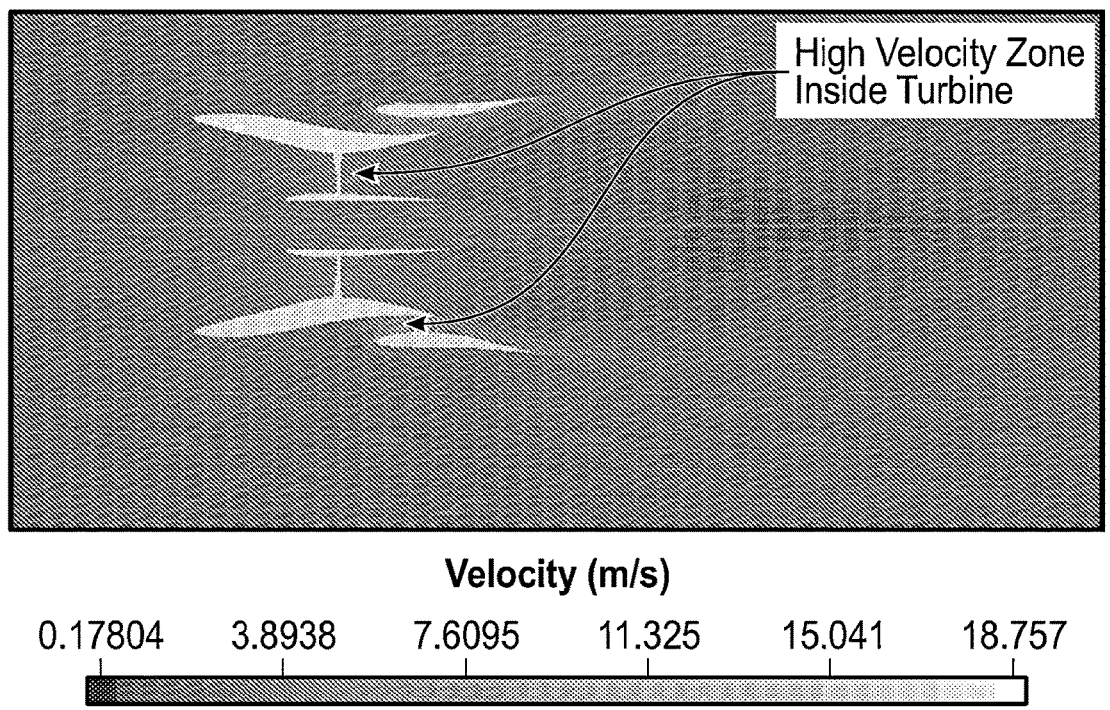
FIGS. 38A and 38B illustrate CFD measurements, in velocity streamlines and pressure fields, respectively, of an embodiment according to the invention.
Figure 38B:
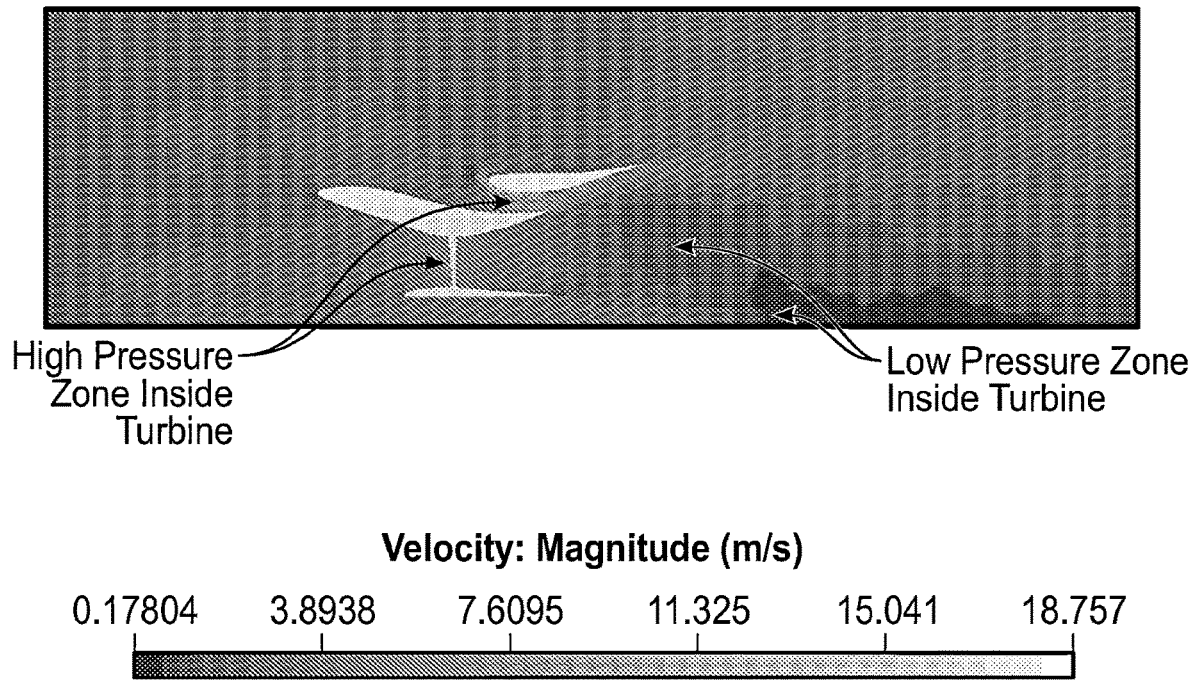

The following is an example of results, from a solver program, of the CFD analysis conducted in 3-D for an early design of an accelerator shroud and center hub, with the annular diffuser. With reference to FIG. 38A, there is depicted the pressure differential inside the turbine as a result of flow acceleration, by means of showing streamlines. This is also used to determine if there is any turbulence in the water flow that could reduce the efficiency. With reference to FIG. 38B, there are shown the pressure fields that result from the flow streamlines shown in FIG. 38A.

These examples of the CFD analysis from an already partially optimized accelerator shroud and center hub, with the annular diffuser added on, demonstrate a synergistic effect of the elements together creating a much greater pressure differential.

In CFD, the program creates an elaborate mesh of polyhedral shapes to simulate the fluid volume and a very precise shape of the turbine in the form of a mesh composed of millions of triangles. Afterwards, this newly created model is run through the solver of the program, which analyzes the fluid/water flow (polyhedral bodies) over the turbine shape (triangle mesh) and shows the flow paths created by it. In this way, the final optimized shapes and configuration of the components are arrived at by making changes and assessing the consequences of those changes based on the testing feedback provided by CFD analysis, until a final optimum combination of shapes is achieved.

Figure 39:
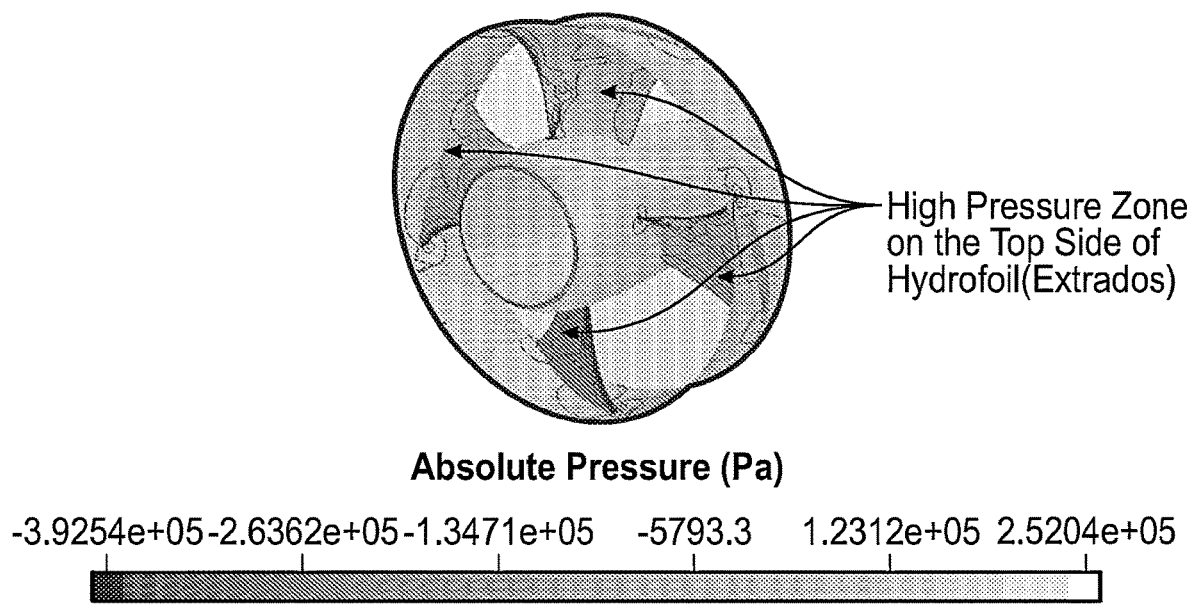
FIGS. 39 and 40 show pressure differential on the front of the blades and on the back of the blades, respectively, in CFD testing.
Figure 40:
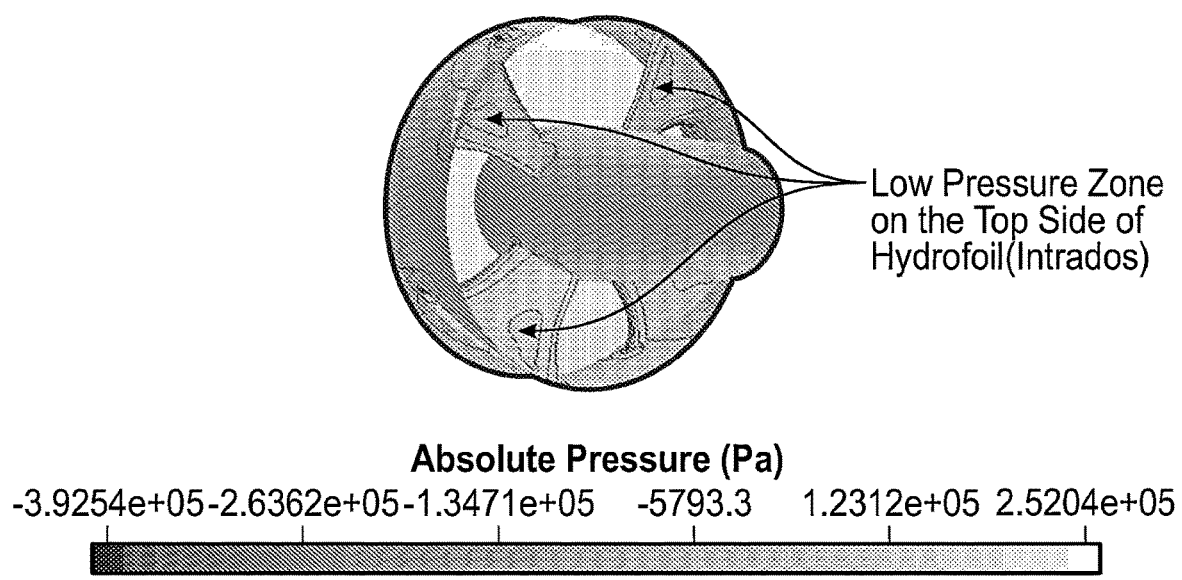

Once all the hydrofoil shapes are optimized and shown to work in harmony with one another, the potential energy extraction or electrical output is calculated. Here is an exemplary result of the analysis of a particular blade shape developed during the early phase of the design, using CFD to analyze pressure differential between both sides of the rotor blades (intrados and extrados) as they rotate through the water (to determine optimum shape and number of blades). Reference here is to FIGS. 39 and 40, which illustrate the respective high and low pressure zones on the two sides of the rotor blades.

It will be appreciated that there are elements of trial and error involved not only in the first stage but also to some degree in the second stage of the process. In the first stage, the trial and error is informed not only by the skill of the artisan applying the principles taught in this application, but also by an intuitive application of the general principles of fluid dynamics, and more importantly by the quantitative test results provided by the various types of software that are applied to verify the effects of each modification made to the individual component designs. In the second stage, where testing is done in 3-Dimensions and for combinations of components, there are obviously many opportunities for changes that can be made; however, optimization is relatively straightforward at this point. From the CFD analysis, areas evidencing lack of laminar flow and/or turbulence can be detected and then modified to remove these unwanted flow effects. Typically, the target is considered to be what is theoretically believed to be the maximum possible improvement in results, for example, an increase in flow speed through the turbine of about three times the incoming, ambient current velocity. Alternatively, a target of a certain improvement in turbine power output, compared to known, comparably sized turbine, can be chosen. When either or both of these targets is/are approached or reached, optimization is considered to be achieved. For example, in FIGS. 34 and 35 the essential dimensions are shown for one preferred embodiment of a turbine according to the invention, namely, a 1.5 meter diameter turbine that has been optimized for use in a current having a speed in the region of 3 knots as shown in the following Legends.

Figure 13:
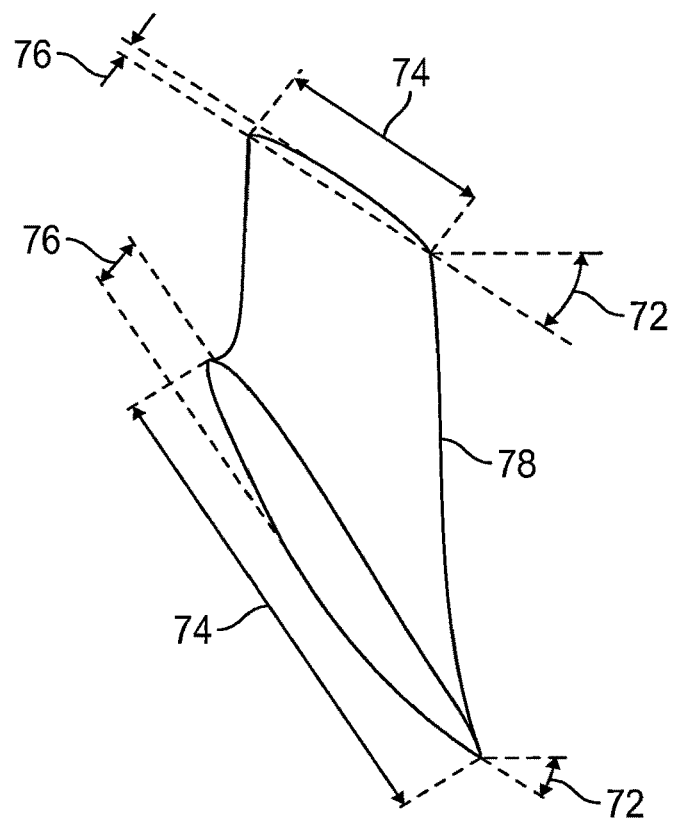
FIG. 13 is a cross-sectional view of one embodiment of a rotor blade, illustrating certain preferred features, including the variable angle of attack, variable cord length, and variable thickness of profile and twist.
Figure 14:
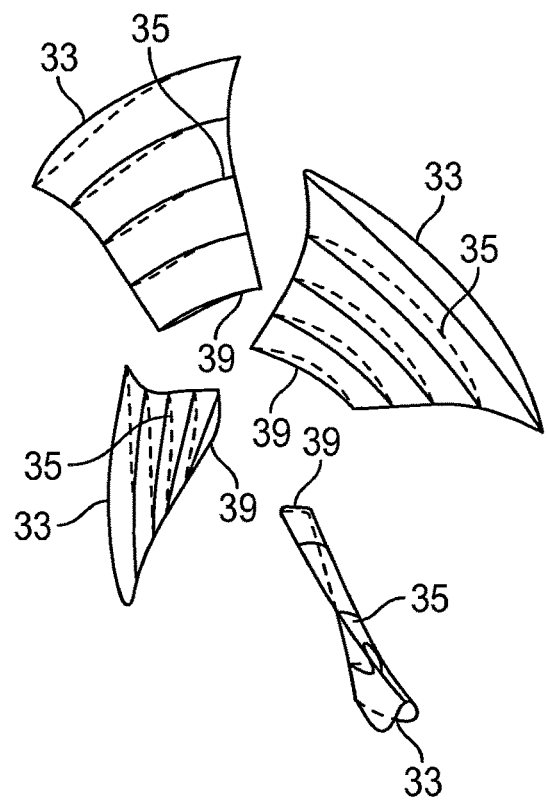
FIG. 14 is an isolated perspective view of a four rotor blade embodiment, with cross-sections of hydrofoil shapes of the blades.
Figure 15:
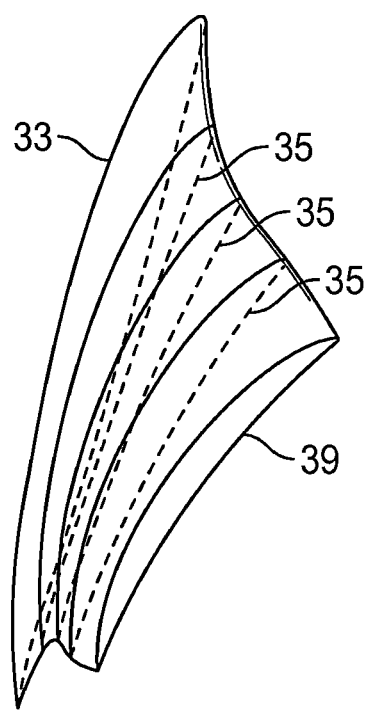
FIG. 15 is a perspective view of single rotor blade alone with cross-sections of hydrofoil shapes.

| Legend for FIGS. 13 and 34 | | |
|---|---|---|
| 72 | Angle of incidence measured in degrees | Angle between axis of flow direction and axis of profile/cord length |
| 74 | Profile/cord length measured in meters | Distance between leading-edge and trailing edge |
| 75 | Length of rotor blade | Distance between root and tip of blade |
| 76 | Profile/cord thickness measured in meters | Maximum distance between intrados and extrados |
| 78 | Twist of blade measured in degrees | Difference between incidence at root of the blade and incidence at tip of blade |

| Legend for FIG. 34 | | |
|---|---|---|
| 72 | Angle of incidence at root of blade | 35° |
| 72 | Angle of incidence at tip of blade | 58° |
| 74 | Profile/cord length at root of blade | 0.181 m |
| 74 | Profile/cord length at tip of blade | 0.588 m |
| 75 | Length of rotor blade | 0.498 m |
| 76 | Profile/cord thickness at tip of blade | 0.035 m |
| 76 | Profile/cord thickness at root of blade | 0.107 m |
| 78 | Twist of blade measured in degrees | 23° |
| 95 | Flow direction | — |

Figure 35:
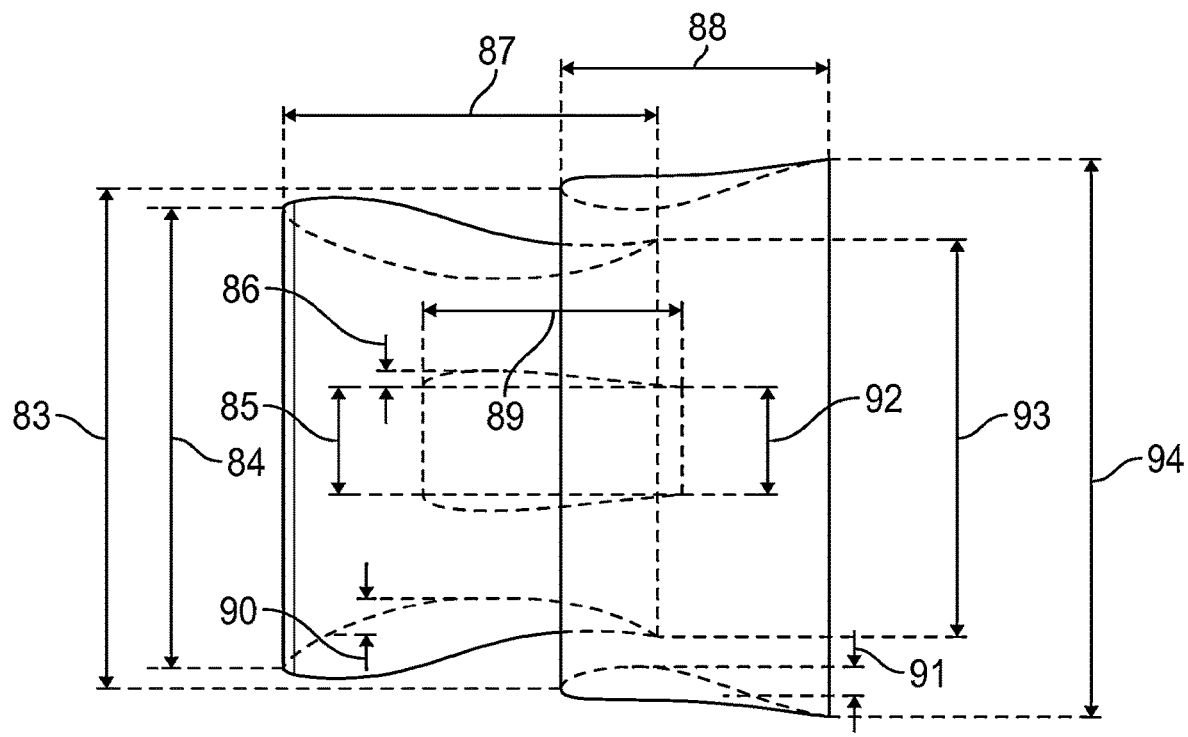
FIG. 35 is a more detailed schematic side view of an accelerator shroud, diffuser and center hub optimized for a 1.5 m rotor section diameter turbine to be used in a 3 kn current, utilizing the rotor blade of FIG. 34.

| Legend for FIG. 35 | | |
|---|---|---|
| 83 | Diameter of diffuser entrance | 2.430 m |
| 84 | Diameter of accelerator shroud entrance | 2.217 m |
| 85 | Overall diameter of center hub | 0.665 m |
| 86 | Profile/cord thickness of center hub | 0.084 m |
| 87 | Length of accelerator shroud | 1.651 m |
| 88 | Length of diffuser | 1.188 m |
| 89 | Length of center hub | 1.131 m |
| 90 | Profile/cord thickness of accelerator shroud | 0.260 m |
| 91 | Profile/cord thickness of diffuser | 0.158 m |
| 92 | Diameter of center hub exit | 0.500 m |
| 93 | Diameter of accelerator shroud exit | 1.917 m |
| 94 | Diameter of diffuser exit | 2.694 m |

Subsequently, the structural aspects of the design shape are analyzed in a Finite Element Analysis program, such as that called CD-Adapco FEA, Scan and Solve or similar. This structural engineering is to confirm that the shapes of the profiles that have been determined can actually be built with the requisite strength, e.g., with composite materials. There are also several other software programs that can also be utilized along the way, such as SolidWorks, AutoCAD, with mechanical event simulation, but they are minor contributors to the design.

Once the shapes of the turbine are determined by intuitive design/sketching, optimizing of shapes in 3-D modeling and CFD analysis, stage III of the development begins. This stage is the physical building of a fully functional prototype and testing in real-life conditions while monitoring and documenting all parameters of the design. This involves recording of rpm of the rotor section, electrical output of the turbine unit, video recording of the flow characteristics through tufting of all surfaces (similar to an airplane wing in a wind tunnel). These tests are conducted at various different flow speeds from 1 kn up to 6 kn utilizing various configurations of accelerator shroud shapes annular diffuser shapes and rotor section shapes. Ultimately this test results, in final confirmation of the functionality and efficiency of the design for a given flow speed and a specific turbine size.

Site-Specific Design

Furthermore, this unique methodology of design can be utilized to improve the extraction the maximum power out of any given naturally occurring water current by site-specific design. The first step of site-specific design consists of flow data collection of the characteristics at a specific location or site. The flow speeds, the flow direction, the flow mass characteristics (volume of water flowing at any specific time) and the fluctuations in flow over a given period of time will be precisely measured and recorded with the aid of acoustic Doppler equipment. The second step is to assess, log and record the types and quantities of sea life and wildlife in the area chosen for the installation site by prolonged video recording, diving and logging of all the species and size of sea life. It is also necessary to log the type and quantity of debris floating in the water. There after the above stated design methodology can begin and then an optimized turbine for a specific site can be developed by first slightly adjusting the hydrofoil shape of the accelerator shroud, the diffuser, the center hub and the rotor blades, and then adjusting the spacing of the bars on the wild life and debris excluder to the local needs. This will assure that no wildlife is harmed by the turbine, that the turbine does not get harmed by floating debris, and that the maximum amount of energy/electricity can be extracted at the precise location.

All of the computer programs that have been mentioned in the foregoing description of the methodology of the present invention are commercially available, and their modes of use are likewise well known to persons skilled in this art.

Thus, the Applicant has conceived of certain novel designs for hydrokinetic turbines, has furthermore taken concepts, tools and information from a number of different fields, and has employed and/or combined them in a novel manner to design unidirectional hydrokinetic turbines that exhibit a significantly higher efficiency. This is due largely to the synergistic interaction of multiple, novel turbine components that embody novel asymmetric hydrofoil characteristics, which have been fine-tuned in a new way for the specific environment in which they are to be employed. The "Novelty of Design Process" is evident because never before have engineers and designers been able to achieve the highly efficient results as demonstrated in connection with the hydrokinetic turbines according to the present invention. These efficiencies permit the turbines of the invention to be usefully employed in many contexts in which the current speed is too low to permit use of prior art turbines.

The design of these hydrokinetic turbines and/or components is unique because of the fact that no other design up until the present has combined every possible hydrodynamic advantage, let along in novel combinations (in component selection, component design and interaction of these components together) to optimize the output of the turbine and accelerate the flow of the water to extract more energy as is possible with the turbines of the present invention. Although hydrodynamic principles are well known, the use of these principles and the combination of novel designs and the effects of all the different elements used in this design, especially the mutually beneficial and synergistic effects of these elements combined together, are new and inventive. As demonstrated in this design, each and every element is initially designed and then optimized for the flow speed and size of turbine, and therefore the end result is a hydrokinetic turbine with much greater output and efficiency than other designs proven up to present.

What is claimed is:

1. A unidirectional hydrokinetic turbine having a water entrance end and a water exit end defining a direction of water flow through the turbine, comprising:
a generally cylindrical accelerator shroud that comprises a radially inner wall and a radially outer wall spaced apart from the radially inner wall, to form a radial wall cross-section that defines within its cylindrical cross-section a water flow area that contains therein structure that consists essentially of an integral hydrokinetic force-generating member that rotates during force generation within the accelerator shroud, the integral force generating member comprising:
a center hub member having an open center surrounded by an inner wall and having a hydrofoil profile; and
a plurality of rotor blades, each blade having two edges and extending radially outwardly from a radially inner base end thereof, at which base end each rotor blade is mounted on said center hub member for rotation therewith, said rotor blades terminating at radially outer blade tips, wherein said rotor blades have a profile thickness at their radially outer ends that is greater than the profile thickness at their radially inner ends, wherein said force-generating member is mounted at said outer blade tips for its support and for rotation, within the wall cross-section of said accelerator shroud.

2. The unidirectional hydrokinetic turbine of claim 1, wherein the hydrokinetic force-generating member further comprises a rotating rotor assembly that further comprises a rotor outer ring to which the blade tips are attached and which has an outer circumference that is configured for rotation within the accelerator shroud wall cross-section.

3. The unidirectional hydrokinetic turbine of claim 2, wherein the rotating rotor assembly comprises a generally round profile having an outer wall, and wherein the inner wall surrounding the open center and the outer wall together form an asymmetric hydrofoil profile, with extrados facing toward an outside of the turbine and intrados facing towards a center of the rotating rotor assembly.

4. The unidirectional hydrokinetic turbine of claim 2, wherein the hydrokinetic force-generating member further comprises at least one magnet or at least one stator winding mounted on the rotor outer ring or on at least one blade tip for rotation within the rotor assembly.

5. The unidirectional hydrokinetic turbine of claim 1, wherein the blades have an asymmetrical hydrofoil-shaped cross-sectional configuration.

6. The unidirectional hydrokinetic turbine of claim 1, wherein the center hub has a length that extends both forwardly and rearwardly past the edges of the blades.

7. The unidirectional hydrokinetic turbine of claim 1, wherein the center hub extends from the blades forwardly to a first point that is rearward of the water entrance end of the accelerator shroud, and extends rearwardly to a point at least as far as the water exit end of the accelerator shroud.

8. The unidirectional hydrokinetic turbine of claim 1, wherein the center hub extends a total distance of between $7/12$ and $9/12$ of the accelerator shroud's length.

9. The unidirectional hydrokinetic turbine of claim 1, further comprising an annular diffuser, wherein the annular diffuser:
comprises a generally cylindrical ring member that has a wall cross-section comprising an asymmetrical hydrofoil shape;
has a diameter greater than the diameter of the accelerator shroud;
is spaced apart radially from the accelerator shroud; and
is positioned to extend behind the accelerator shroud in the direction of water flow through the turbine in an axially overlapping relationship with the accelerator shroud.

10. The unidirectional hydrokinetic turbine of claim 9, further comprising a second annular diffuser mounted downstream of the annular diffuser.

11. The unidirectional hydrokinetic turbine of claim 9, wherein the accelerator shroud has a diameter at its water exit end that is greater than the diameter at its water inlet end, and wherein the annular diffuser has a diameter at its upstream end that is less than a diameter at its downstream end.

12. The unidirectional hydrokinetic turbine of claim 1, wherein the accelerator shroud has a forward portion upstream of the blades and a rearward portion downstream of the blades, comprising a hydrofoil shape with a generally S-shaped profile in which a radially outer surface comprises a forward convex portion and a rearward concave portion, and a radially inner surface comprises a rearward convex portion and a forward portion, measured from the blades to the water entrance end, that has a shape that is either straight or concave.

13. The unidirectional hydrokinetic turbine of claim 1, wherein the rotor blades have a generally straight axis extending radially from the open center to their blade tips.

14. The unidirectional hydrokinetic turbine of claim 1, wherein a subset of the rotor blades has a chord length at their radially outer ends that is greater than the chord length at their radially inner ends.

15. A unidirectional hydrokinetic turbine, having a water entrance end and a water exit end defining a direction of water flow through the turbine, comprising:

a generally cylindrical accelerator shroud that comprises a radially inner wall and a radially outer wall spaced apart from the radially inner wall, to form a radial wall cross-section that defines within its cylindrical cross-section a water flow area that contains therein structure that consists essentially of an integral hydrokinetic force-generating member that rotates during force generation within the accelerator shroud, the integral force generating member comprising:

a center hub member having an open center surrounded by an inner wall and having a hydrofoil profile; and a plurality of rotor blades, each rotor blade having two edges and extending radially outwardly from a radially inner base end thereof, at which base end each rotor blade is mounted on said center hub member for rotation therewith, said rotor blades terminating at radially outer blade tips, wherein said force-generating member is mounted at said outer blade tips for its support and for rotation, within the wall cross-section of said accelerator shroud;

wherein the accelerator shroud has a forward portion upstream of the rotor blades and a rearward portion downstream of the rotor blades, comprising a hydrofoil shape with a generally S-shaped profile in which a radially outer surface comprises a forward convex portion and a rearward concave portion, and the radially inner surface comprises a rearward convex portion and a forward portion, measured from the rotor blades to the water entrance end that has a shape that is either straight or concave; and wherein the radially inner surface of the forward portion of the generally S-shaped profile is concave.

16. A unidirectional hydrokinetic turbine having a water entrance end and a water exit end defining a direction of water flow through the turbine, comprising:

a generally cylindrical accelerator shroud that has a wall cross-section that comprises an asymmetrical hydrofoil shape and defines within its cylindrical cross-section a flow area, said hydrofoil shape serving to accelerate the flow of water through the accelerator shroud and to create a negative pressure field behind the accelerator shroud, in the direction of water flow;

a rotor assembly that is mounted for rotation within the accelerator shroud around an axis that is generally parallel to the direction of water flow through the turbine, the rotor assembly comprising:

a plurality of rotor blades extending radially outwardly from an open center of the turbine and terminating at rotor blade tips, which blades have an asymmetrical hydrofoil-shaped cross-sectional configuration, wherein said blades have a profile thickness at their radially outer ends that is greater than the profile thickness at their radially inner ends; and a rotor outer ring to which the blade tips are directly attached, and the outer ring being configured to support the rotor assembly within the accelerator shroud and having a radially outer circumference which is configured for rotation within said accelerator shroud wall cross-section; and a first annular diffuser comprising, a generally cylindrical ring member that has a wall cross-section comprising an asymmetrical hydrofoil shape, said annular diffuser having a diameter greater than the diameter of said accelerator shroud, being radially spaced from said accelerator shroud, and being positioned behind the accelerator shroud, in the direction of water flow through the turbine, whereby the hydrofoil shape of the annular diffuser serves to accelerate the flow of water through the annular diffuser and to create a negative pressure field behind the annular diffuser, and in cooperation with the hydrofoil of said accelerator shroud and said blades to augment acceleration of water flow through the accelerator shroud at the rotor assembly.

17. The unidirectional hydrokinetic turbine of claim 16, further comprising a center hub that comprises a generally round profile member having an outer wall cross-section comprising a hydrofoil shape, and having an open center surrounded by an inner wall and wherein the inner wall surrounding the open center and the outer wall form an asymmetric hydrofoil profile, with extrados facing toward an outside of the turbine and intrados facing toward a center of the hub.

18. The unidirectional hydrokinetic turbine of claim 17, wherein the center hub has a length that extends both forwardly and rearwardly past edges of the blades.

19. The unidirectional hydrokinetic turbine of claim 17, wherein the center hub extends from the blades forwardly to a first point that is rearward of the water entrance end of the accelerator shroud, and extends rearwardly to a point at least as far as the water exit end of the accelerator shroud.

20. The unidirectional hydrokinetic turbine of claim 17, wherein the center hub extends a total distance between $7/12$ to $9/12$ of the accelerator shroud's length.

21. The unidirectional hydrokinetic turbine of claim 16, wherein the rotating rotor assembly comprises a generally round profile having an outer wall, and wherein the inner wall surrounding the open center and the outer wall together form an asymmetric hydrofoil profile, with extrados facing toward an outside of the turbine and intrados facing towards a center of the rotating rotor assembly.

22. The unidirectional hydrokinetic turbine of claim 16, further comprising at least one magnet or at least one stator winding mounted on the rotor outer ring or on at least one blade tip for rotation within the rotor assembly.

23. The unidirectional hydrokinetic turbine of claim 16, further comprising a second annular diffuser mounted downstream of the annular diffuser.

24. The unidirectional hydrokinetic turbine of claim 16, wherein the accelerator shroud has a diameter at its water exit end that is greater than the diameter at its water inlet end, and wherein the annular diffuser has a diameter at its upstream end that is less than a diameter at its downstream end.

25. The unidirectional hydrokinetic turbine of claim 16, wherein the accelerator shroud has a forward portion upstream of the blades and a rearward portion downstream of the blades, and wherein the hydrofoil shape comprises a generally S-shaped profile in which a radially outer surface comprises a forward convex portion and a rearward concave portion, and a radially inner surface comprises a rearward convex portion and a forward portion, measured from the blades to the water entrance end, that has a shape that is either straight or concave.

26. The unidirectional hydrokinetic turbine of claim 16, wherein the rotor blades have a generally straight axis extending radially from the open center to their blade tips.

27. The unidirectional hydrokinetic turbine of claim 16, wherein a subset of the rotor blades has a chord length at their radially outer ends that is greater than the chord length at their radially inner ends.

* * * * *